United States Patent [19]

Koshino et al.

[11] Patent Number: 5,072,423
[45] Date of Patent: Dec. 10, 1991

[54] OPTICAL INFORMATION MEMORY MEDIUM RECORDING A.  D ERASING INFORMATION INCLUDIN  GALLIUM AND ANTIMONY

[75] Inventors: Nagaaki Koshino, Yokohama; Miyozo Maeda, Atsugi; Yasuyuki Goto, Atsugi; Itaru Shibata, Tokyo; Kenichi Utsumi, Sagamihara; Akira Ushioda, Atsugi; Ken-ichi Itoh, Yamato; Kozo Sueishi, Atsugi, all of Japan

[73] Assignee: Fujitsu Limited, Kawasaki, Japan

[21] Appl. No.: 681,457

[22] Filed: Apr. 4, 1991

Related U.S. Application Data

[60] Continuation of Ser. No. 536,802, Jun. 12, 1990, abandoned, which is a division of Ser. No. 401,499, Aug. 3, 1989, which is a continuation of Ser. No. 101,367, Sep. 25, 1987, abandoned, which is a division of Ser. No. 803,294, Dec. 2, 1985, abandoned.

[30] Foreign Application Priority Data

| Dec. 5, 1984 | [JP] | Japan | 59-255672 |
| Dec. 5, 1984 | [JP] | Japan | 59-255673 |
| Dec. 28, 1984 | [JP] | Japan | 59-274502 |
| Dec. 28, 1984 | [JP] | Japan | 59-274537 |
| Jan. 19, 1985 | [JP] | Japan | 60-006669 |
| Jan. 19, 1985 | [JP] | Japan | 60-006670 |
| Jan. 19, 1985 | [JP] | Japan | 60-006671 |
| Mar. 30, 1985 | [JP] | Japan | 60-067983 |

[51] Int. Cl.$^5$ .............................................. G11C 13/04
[52] U.S. Cl. .................................. 365/106; 365/113; 365/114; 365/215; 365/163; 346/76 L; 346/137; 369/284; 430/495; 430/945
[58] Field of Search ............... 365/106, 113, 114, 127, 365/128, 163, 215, 234; 346/76 L, 135.1, 137; 357/2; 430/495, 945; 369/272, 277, 283, 284, 286

[56] References Cited

U.S. PATENT DOCUMENTS

| 3,271,591 | 9/1966 | Ovshinsky | 365/113 |
| 3,868,651 | 2/1975 | Ovshinsky | 365/113 |
| 4,237,468 | 12/1980 | Nahara et al. | 346/135.1 |
| 4,373,004 | 2/1983 | Asano et al. | 346/76 L |
| 4,460,636 | 7/1984 | Watanabe | 346/135.1 |
| 4,653,024 | 3/1987 | Young et al. | 365/113 |

Primary Examiner—Glenn Gossage
Attorney, Agent, or Firm—Staas & Halsey

[57] ABSTRACT

Recording and erasing optical information can be done by using an alloy film capable of forming two stable crystalline states differing in crystal texture and optical characteristics by being irradiated with optical energies under different conditions. The thin memory film preferably includes not more than 60 atom % of Gallium (Ga) and not less than 40 atom % of Antimony (Sb). The thin memory film preferably includes not more than 60 atom % of Gallium (Ga) and not less than 40 atom % of Antimony (Sb).

4 Claims, 17 Drawing Sheets

DIFFRACTION PATTERN

DIFFRACTION PATTERN

VISUAL IMAGE (RECORDED) ⊢—⊣ 1μm

VISUAL IMAGE (ERASED) ⊢—⊣ 1μm

OPTICAL INFORMATION MEMORY MEDIUM RECORDING AND ERASING INFORMATION INCLUDING GALLIUM AND ANTIMONY

This application is a continuation of application Ser. No. 07/536,802, filed June 12, 1990, now abandoned, which is a divisional of application Ser. No. 07/401,499 filed on Aug. 3, 1989, which is a continuation of Ser. No. 101,367 filed Sept. 25, 1987, now abandoned, which is a divisional of Ser. No. 06/803,294, filed Dec. 2, 1985, now abandoned.

BACKGROUND OF THE INVENTION

1. Field of the Invention

The present invention relates to medium for optically storing information as in an optical disk. More particularly, the present invention relates to an optical information memory medium in which once-recorded information can be erased and new information can be re-corded. The invention also relates to methods and apparatus for recording and erasing and reading information by using such an memory medium.

2. Description of the Related Art

Since a high memory speed and density are enabled in the optical storing of information, the optical information storing method has attracted attention as a promising information storing method. Among the conventional optical information memory mediums, there is a medium in which a metal film is irradiated with laser beams and fine holes are formed at the irradiated part to store information. In this medium, recording is possible, but the medium is limitative in that erasure of the recorded information and the recording of new information are impossible. As the memory medium in which not only the optical recording of information but also erasure, and re-recording are possible, there is known a memory medium in which a film of an amorphous semiconductor such as $Te_{81}Ge_{15}S_2P_2$ is used, and two structural states, that is, a stable high-resistance state (the so-called amorphous state where the arrangement of atoms or molecules is disturbed) and a stable low-resistance state (the so-called crystalline state where atoms or molecules are regularly arranged), are reversibly interchanged to effect the recording, erasure, and re-recording of information (see U.S. Pat. No. 3,530,441, and Japanese Examined Patent Publication (Kokoku) No. 47-26897).

However, in the above-mentioned erasable memory medium, since the state of the disturbed atom arrangement (amorphous state) is used as one state, retention of the information is inherently unstable. This is because the amorphous state is a metastable state leading to the crystalline state, and the amorphous state is readily changed to the crystalline state by the application of thermal energy or chemical energy, and thus stored information is easily lost. Moreover, since transition is effected between two greatly different states, that is, the amorphous and crystalline states, fatigue occurs during the repeated recording and erasure, and accordingly, the number of repetitions of recording and erasure is limited.

Investigations have been made into alloys which are similar to the subject materials of the present invention, but these materials have not been used as a memory medium in which information is recorded and erased between two stable crystalline states, since the above investigations were directed to finding a memory medium capable of assuming two states, i.e., between the amorphous and crystalline states (for example, M. Wihl, M. Cardona and J. Tauc, "RAMAN SCATTERING IN AMORPHOUS Ge and III-V COMPOUNDS, Journal of Non-Crystalline Solids 8-10 (1972), 172-178; G. Fuxi, S. Baorong and W. Hao, GLASS FORMATION OF SEVERAL SEMICONDUCTORS AND ALLOYS BY LASER IRRADIATION, Journal of Non-Crystalline Solids 56 (1983), 201-206; W. Eckenback, W. Fuhs and J. Stuke, PREPARATION AND ELECTRICAL PROPERTIES OF AMORPHOUS InSb, Journal of Non-Crystalline Solids 5 (1971), 264-275; J. Feinleib, J. deNeufville, S. C. Moss and S. R. Obshinsky, RAPID REVERSIBLE LIGHT-INDUCED CRYSTALLIZATION OF AMORPHOUS SEMICONDUCTORS, Applied Physics Letters, Vol. 18, No. 6, Mar. 3 (1971) 254-257; IBM Thomas J. Watson Research Center, LASER WRITING AND ERASING ON CHALCOGENIDE FILMS, Journal of Applied Physics, Vol. 43, No. 11, Nov. (1972), 4688-4693).

DISCLOSURE OF THE INVENTION

It is a primary object of the present invention to provide an optical information memory medium in which information is recorded by irradiation with optical pulses, the recorded information can be erased if required, or the information can be stably retained.

In order to attain this object, in accordance with the present invention, a film composed of an aggregate of crystallites having a regular atom arrangement, which includes at least two stable states differing in optical characteristics, is irradiated with two kinds of optical pulses differing in power and time width, and one of the above-mentioned two states is produced to store information. In the present invention, both of the stable states of the memory film for recording information, which differ in optical characteristics, are crystalline states, and the transition between two crystalline stable states differing in optical characteristics is utilized. In the present invention, in order to distinguish the crystalline state from the amorphous state, the term "crystalline" denotes that the size of the region of the film having a regular atom arrangement (the particle size of the crystallite) is at least about 5 nm and ordinarily 20 to 30 nm or larger.

Since the two stable states of the crystalline memory film of the present invention are reversibly interchanged by irradiation with optical pulses under appropriate conditions, once-recorded information can be erased and the film can be used repeatedly.

Ordinarily, the two stable states of the crystalline film have a high electric conductivity and there is no substantial difference between the electric conductivities of the two states (the electric conductivity of the amorphous state is essentially lower than that of the crystalline state).

The two crystalline stable states of the crystalline film are slightly different in optical characteristics such as light reflectance and light transmittance, and therefore, the state of recording of information and the state of erasure of information can be discriminated based on the difference of reflectance. Moreover, the two stable states accompany a slight change of the volume and a slight deformation of the shape of the film, and therefore it is supposed that the optical difference is consequently increased.

This memory medium does not utilize the transition between the amorphous state and the crystalline state. Since the amorphous phase is a metastable phase, the amorphous phase is gradually transformed into the crystalline phase by the action of heat over a long period. Accordingly, if the difference between the two phases is utilized for the storing of information, the information is easily lost. In contrast, in the present invention, transition is effected between two states of one thermodynamically stable phase, that is, the crystalline phase, and therefore, information can be stably retained for a long time.

As the material of the crystalline film showing at least two stable states differing in crystal structure and optical characteristics, there can be mentioned, for example, an alloy comprising 80 atom % or less, preferably 15 to 50 atom %, more preferably 35 to 45 atom %, of indium (In) and 20 atom % or more, preferably 50 to 85 atom %, more preferably 55 to 65 atom %, of antimony (Sb). Furthermore, an alloy comprising In in an amount of 80 atom % or less and Sb in an amount of 20 atom % or more, and additionally comprising at least one element selected from aluminum (Al), silicon (Si), phosphorus (P), sulfur (S), zinc (Zn), gallium (Ga), germanium (Ge), arsenic (As), selenium (Se), silver (Ag), cadmium (Cd), tin (Sn), tellurium (Te), thallium (Tl), lead (Pb), bismuth (Bi), etc. in an amount of up to 20 atom %, preferably 5 to 20 atom %, based on the total elements can be mentioned.

There can be also mentioned an alloy comprising 70 atom % or less, preferably 10 to 40 atom %, more preferably 20 to 30 atom %, of Tl and 30 atom % or more, preferably 60 to 90 atom %, more preferably 70 to 80 atom %, of Bi. An alloy comprising Tl in an amount of 70 atom % or less and Bi in an amount of 30 atom % or more, and additionally comprising at least one element selected from Al, Si, P, S, Zn, Ga, Ge, As, Se, Ag, Cd, In, Sn, Sb, Te, Pb, etc., in an amount of up to 20 atom %, preferably 5 to 20 atom %, based on the total elements also can be mentioned.

There can be also mentioned an alloy comprising 85 atom % or less, preferably 30 to 60 atom %, more preferably 40 to 60 atom %, of Ga and 15 atom % or more, preferably 40 to 70 atom %, more preferably 40 to 60 atom %, of Bi. And an alloy comprising Ga in an amount of 85 atom % or less and Bi in an amount of 15 atom % or more, and additionally comprising at least one element selected from the group of Al, Si, P, S, Zn, Ge, As, Se, Ag, Cd, In, Sn, Sb, Te, Tl, Pb, etc., in an amount of up to 20 atom %, preferably 5 to 20 atom %, can be mentioned.

There can be further mentioned an alloy comprising up to 65 atom %, preferably up to 50 atom %, more preferably 15 to 25 atom %, of In and 35 atom % or more, preferably 50 atom % or more, more preferably 75 to 85 atom %, of As. An alloy comprising In in an amount of up to 65 atom % and As in an amount of 35 atom % or more, and additionally comprising at least one element selected from Al, Si, P, Si, Zn, Ga, Ge, Bi, Se, Ag, Cd, Sn, Sb, Te, Tl, Pb, etc., in an amount of up to 20 atom %, preferably 5 to 20 atom % also can be mentioned.

There can be further mentioned an alloy comprising 60 to 90 atom %, preferably 67 to 90 atom %, more preferably 70 to 75 atom %, of In and 10 to 40 atom %, preferably 10 to 33 atom %, more preferably 25 to 30 atom %, of Bi. And an alloy comprising In in an amount of 60 to 90 atom % and Bi in an amount of 10 to 40 atom %, and additionally comprising at least one element selected from Al, Si, P, S, Zn, Ga, Ge, As, Se, Ag, Cd, Sn, Sb, Te, Tl, Pb, etc., in an amount of up to 20 atom %, preferably 5 to 20 atom %, can be mentioned.

There can be still further mentioned an alloy comprising to atom % or less, preferably 5 to 50 atom %, more preferably 15 to 35 atom %, of Ga and 40 atom % or more, preferably 50 to 95 atom %, more preferably 65 to 85 atom %, of Sb. An alloy comprising Ga in an amount of 60 atom % or less and Sb in an amount of 40 atom % or more of Ga, and additionally comprising at least one element selected from Al, Si, P, S, Zn, Ge, As, Se, In, Sn, Te, Bi, Pb, etc., in an amount of up to 20 atom %, preferably 5 to 20 atom %, also can be mentioned.

We also found that alloys comprising two or more elements capable of forming an eutectic mixture and having a composition close to an eutectic mixture in an equilibrium diagram of the above two or more elements, are desirably used as the material of the memory film showing two stable crystalline states differing in crystal texture and optical characteristics, or the material of the memory film of the optical information memory medium according to the present invention.

The term "eutectic phenomenon" is well known in metallurgy and denotes a phenomenon wherein a mixture of two or more elements having a certain composition shows a lower melting point than the original melting points of the consistent element(s) or compound(s). If an alloy having an eutectic composition is solidified from a fused state, the respective constituent element(s) or compound(s) are not mixed with each other in an order of atom or molecule size, but crystallites of the constituent element(s) or compound(s) are uniformly mixed with each other in a solidified alloy.

Phase diagrams of various alloys, including In-Sb, Tl-Bi, Ga-Bi, In-As, In-Bi, and Ga-Sb systems, have been known and are published, for example, as "Constitution of binary alloy", from MCGRAW-HILL.

A film of these materials is formed on a glass, plastic or metal substrate by effecting alloying by co-vacuum-deposition, co-sputtering or co-ionplating of the starting components. Furthermore, the alloyed material may be vacuum-deposited or sputtered.

In the as-deposited film, the atom arrangement is ordinarily disturbed and the film is amorphous. However, if the film is heated or irradiated with light, the entire film or only the recording portion of the film is crystallized.

Thus, in other aspects of the invention, there are provided methods and apparatus for recording and/or erasing optical information, wherein a memory film is irradiated with optical energies under different conditions to selectively form two stable crystalline states differing in crystal texture and optical characteristics at the portion of the memory film irradiated by the optical energies, whereby recording and/or erasing information is effected.

In an embodiment of the method and apparatus according to the invention, by irradiating a spot of the memory film with optical energies under different conditions, the spot of the memory film is fused and then solidified to form different distributions of crystallites having different reflectances or transmittances within the spot of the memory film such that the reflection or transmission of an optical beam from or through the spot of the memory film is different.

In a further embodiment of the method and apparatus according to the invention, by irradiating a spot of the memory film with optical energies under different conditions, the spot of the memory film is fused and then solidified to form two states having compositions at a central portion of the spot wherein the amount of a certain element or compound of the memory film is higher and lower than that of an eutectic mixture consisting of the certain element or compound and the other element or compound of the memory film, whereby recording and/or erasing is effected.

In further aspects of the invention, there are also provided a method and apparatus for reading optical information, wherein information recorded by selectively forming two stable crystalline states in a memory film are read by optically detecting the selectively formed two stable crystalline states.

According to the present invention, recording can be effected at a high density only by irradiating the film with light pulses, and erasure and re-recording can be performed when required. Furthermore, information can be stably retained for a long time.

DESCRIPTION OF THE PREFERRED EMBODIMENTS

Figure 1:
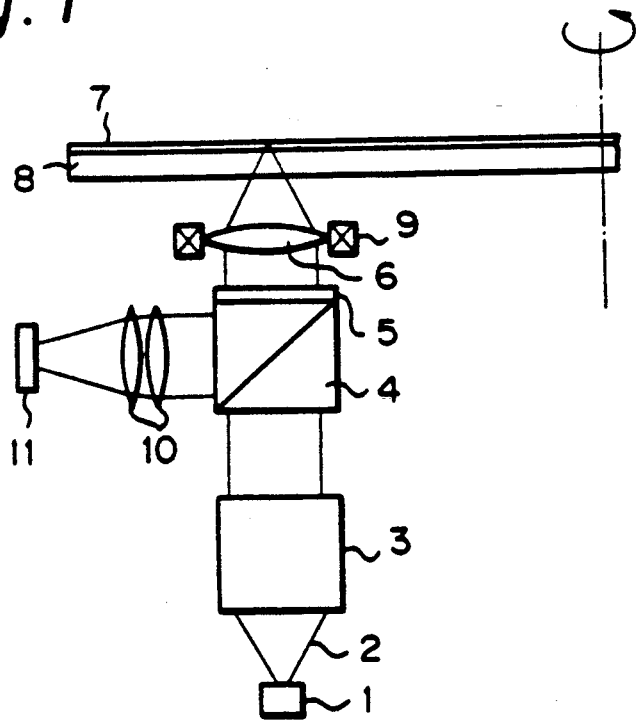
FIG. 1 is a diagram showing the optical system for the storing and reproduction of optical information according to the present invention.

An example of an information-storing optical system comprising the memory medium of the present invention is shown in FIG. 1. This system is the same as the system used for the conventional write-once, hole ablation type disk.

Light 2 (having ordinarily a wavelength of 780 to 830 nm) emitted from a laser diode 1 is passed through a shaping optical system 3, a polarizing beam splitter 4, and a ¼ wavelength plate 5, focussed by an object lens 6, and applied to a memory film 7. In the drawings, reference numerals 8 and 9 represent a substrate and a lens actuator, respectively. The reflected light is deflected in the transverse direction by the polarizing beam splitter 4 and guided to a light detector 11 through a lens 10. The light detector 11 is divided into 4 parts, and the difference in signals of diagonal components indicates the degree of focus displacement.

Ordinarily, the laser diode 1 is driven by a direct current so that a power of about 1 mW is obtained on the surface of the memory film 7, and by using the reflected light from the memory film 7, the lens actuator 9 for the object lens is controlled so that the light beams are always focussed on the film surface. The quantity of the reflected light from the memory film 7 is obtained as a sum signal of four parts of the detector and used for determining the storage state of the signals, that is, reproduction of information.

When information is recorded, a modulation current for modulating the intensity of the laser diode 1 is overlapped on the laser diode 1 by a signal to be recorded.

When information is erased, the desired recorded portion is irradiated with continuous light beams. Also in this case, a light power necessary for erasure is overlapped on the light beam power for reproduction.

A stronger power is ordinarily more necessary at the recording step than at the erasing step. It sometimes happens that erasure cannot be completed by applying light beams only once. This is because a certain time is necessary for changing the film to the erased state. In this case, if the same place is irradiated with erasing beams repeatedly (by a necessary number of rotations), a complete erasure state can be obtained.

Though not shown in FIG. 1, an optical system is often used in which two laser beam sources are arranged, laser beams from one source are applied through the same structure as shown in FIG. 1, and laser beams from the other source are applied in a shape long (up to about 10 $\mu$m) in the circumferential direction on the film surface. In this case, the long beams are used only for erasure, and information can be completely erased by one irradiation.

The power conditions of light beams used for recording and erasion depend on the diameter or rotation speed of the substrate, that is, the speed of the memory film.

Figure 2:
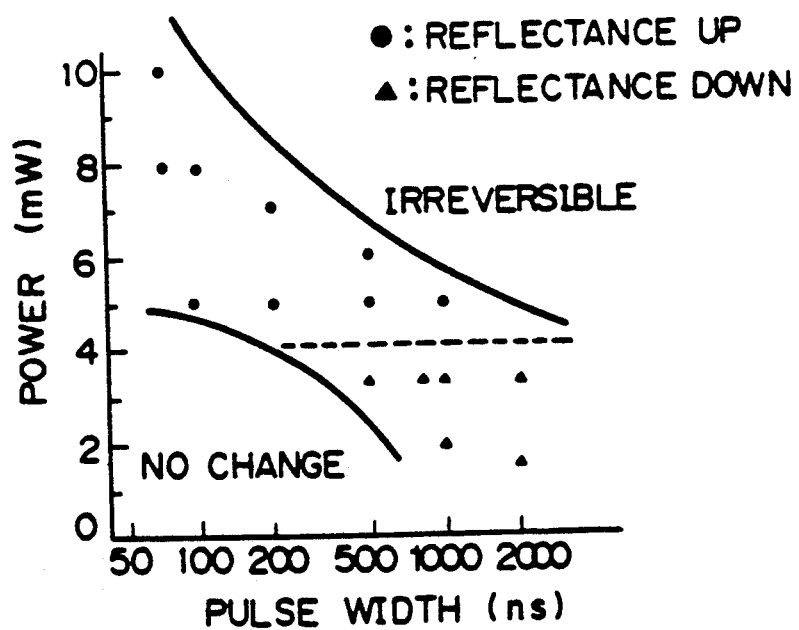
FIG. 2 is a graph showing the change of the reflectance of the memory film according to the conditions of laser light irradiation.

In the examples using an InSb memory film, shown hereinafter, the time of irradiation of one point of the thin film with light beams having a diameter of 1 $\mu$m was changed by changing the rotation number and the radius point, and the relation between the power and irradiation time, showing optical changes corresponding to recording and erasion, was determined to obtain data shown in FIG. 2. In FIG. 2, the ordinate indicates the irradiation beam power and the abscissa indicates the irradiation pulse time. Marks "o" indicate an increase of the reflectance and marks "Δ" indicate a reduction of the reflectance. It can be seen that when strong short pulses are applied, the reflectance of the film is increased, and when weak long pulses are applied, the reflectance is reduced.

As the reflectance is changed, so also is the transmittance changed. In the case of a film of InSb, when the reflectance is increased, the transmittance is reduced, and when the reflectance is reduced, the transmittance is increased. However, the change in the transmittance is smaller than that of the reflectance.

Figure 3:
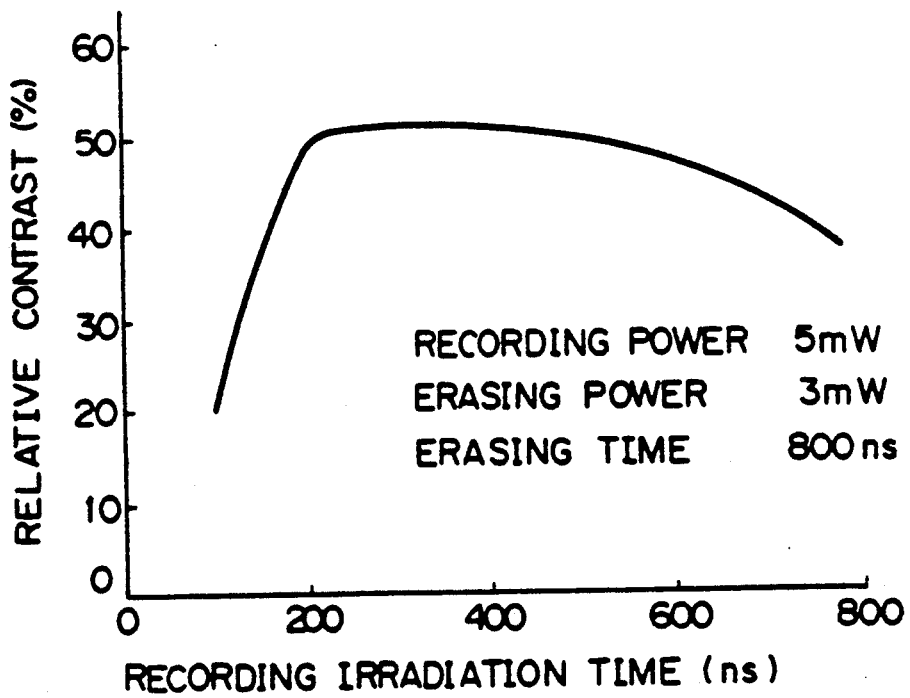
FIG. 3 is a graph showing the relative contrast of recording with respect to the irradiation time for recording.

The amplitude of the signal is substantially proportional to the difference of the reflectance between the recorded and erased states. The results obtained when the relative change of the amplitude of the signal to the irradiation time for recording was determined are shown in FIG. 3, in which the ordinate indicates the relative contrast and the abscissa indicates the recording irradiation time. The power for the recording and the erasure conditions was fixed. As the irradiation time is increased, the quantity of the relative change of the reflectance is increased but, if the irradiation time exceeds a certain limit, the relative change quantity is reduced. Namely, optimum conditions are present.

Laser light, which is coherent light, is suitable as the recording and reproduction light. The wavelength is not limited to that of semiconductor laser light, but those of He-Ne laser light, He-Cd laser light, and Ar laser light can be used.

As the result of analysis of the diffraction patterns shown in the photos of FIGS. 4A and 5A, which were obtained in the after-mentioned example 1, it was presumed that in the case of an InSb alloy film the cause of the change of the reflectance between two states of the crystal structure would be as described below.

Figure 4A:
FIGS. 4A and 4B are electron microscope photos of the electron beam diffraction pattern of the low-reflectance portion of the recording medium and the crystal structure of the film in the low-reflectance portion.
Figure 5A:
FIGS. 5A and 5B are electron microscope photos of the electron beam diffraction pattern of the high-reflectance portion of the recording medium and the crystal structure of the film in the high-reflectance portion.
Figure 4B:
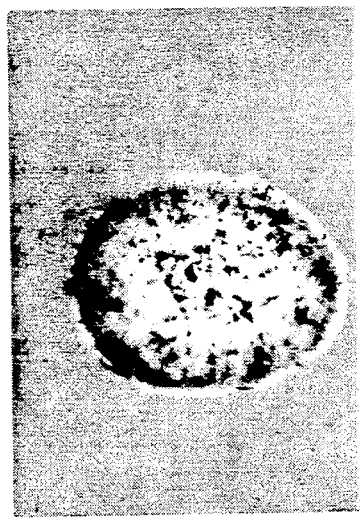
Figure 5B:

Only images (bright field images) shown in the transmission microscope photos of FIGS. 4B and 5B corresponding to FIGS. 4A and 5A are examined. In the bright field images, the sizes of cryst., grains in the central portion are seemingly different, but the following has been confirmed from detailed analysis of the diffraction lines. In both FIGS. 4A and 5A, $In_{50}Sb_{50}$ (cubic crystal, $a_o=6.478$ Å) and Sb (hexagonal crystal, $a_o=4.307$ Å, $c_o=11.273$ Å) are observed, but the intensity ratio of the diffraction lines in FIG. 4A is the converse of that in FIG. 5A. Namely, in FIG. 4A, the diffraction line of $In_{50}Sb_{50}$ is stronger than that of Sb, but in FIG. 5A, the diffraction line of Sb is stronger than that of $In_{50}Sb_{50}$. This means that the amount of Sb precipitated from the alloy InSb is changed according to the irradiation conditions of light. Since it is known that the reflectance of a pure Sb film is 70% and the reflectance of an $In_{50}Sb_{50}$ film is 40%, it can be explained that the larger the amount of Sb precipitated, the higher the reflectance.

There are two probable causes of the manifestation of the difference in the balance between $In_{50}Sb_{50}$ and Sb. Namely, because of the difference of the heating and cooling processes between two kinds of light irradiations, (1) Sb element shifts transversely with respect to the film or (2) the amount of Sb solid-dissolved in $In_{50}Sb_{50}$ is different and the amount of Sb precipitated is different. At any rate, both the states are apparently crystalline states.

Another cause of the formation of two crystalline states seemingly different in reflectance in the film can be considered. For example, since the size of crystal grains are different, a difference of the capacity of scattering light is brought about, which results in the difference of the reflectance. In the above-mentioned example of InSb, the possibility that this mechanism makes a contributions to the change of the reflectance cannot be denied.

Moreover, the change of the configuration of the film will result in the difference in the manner of the light scattering. Apparently, the light scattering effect obtained when the film surface is flat is different from the light scattering effect obtained when the film is deformed to have a concave or convex surface.

Still another possibility can be considered wherein even if the film is crystalline, different crystal phases are formed according to the difference of the cooling process. For example, when the film is irradiated with strong short light pulses, the film is molten, but since the film is abruptly cooled, there is a possibility of the formation of a metastable crystal phase that cannot be obtained by the ordinary melting, cooling, and solidification process.

As is apparent from the foregoing description, a film which is crystalline and in which the reflectance or other optical characteristic is seemingly changed, irrespective of cause, may be changed, although various causes of this change can be considered.

We further investigated the facts as mentioned above and found that an alloy composed of two or more elements capable of forming an eutectic mixture and having a composition close to an eutectic mixture in an equilibrium diagram of these two or more elements can be preferably used for the memory material in the invention, since it can form two stable crystalline states differing in crystal texture and optical characteristics when irradiated by optical energies under different conditions.

The principle of the formation of two stable crystalline states due to the eutectic phenomena is explained as follows.

Figure 6:
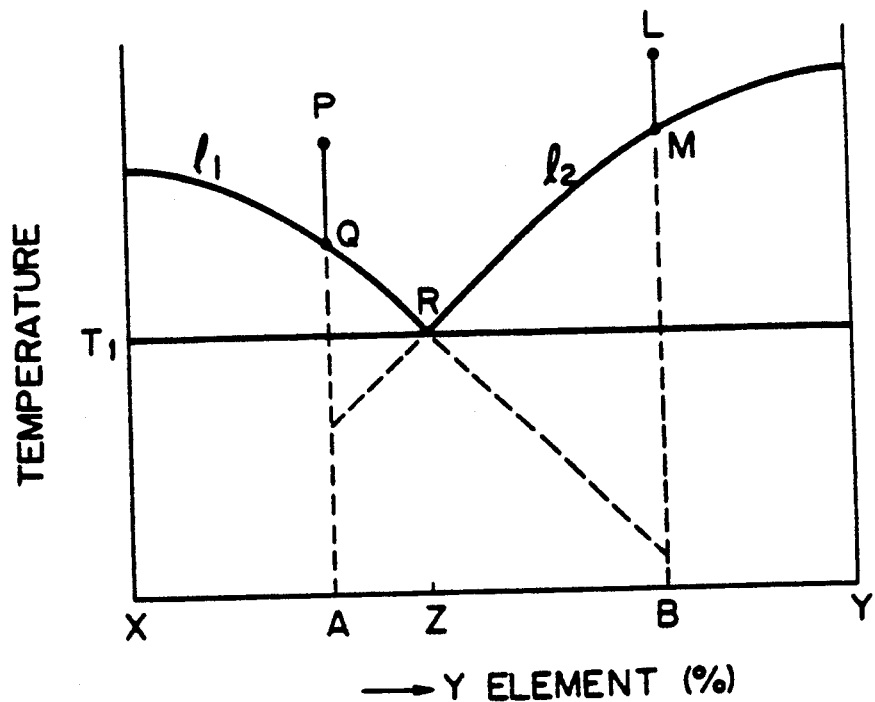
FIG. 6 is a typical equilibrium diagram of a simple binary alloy system.

FIG. 6 schematically shows a typical equilibrium diagram of an alloy of two elements.

The invention can be applied to not only this type of alloy having such a simple equilibrium diagram but also to any alloys having an equilibrium diagram including an eutectic composition as a part thereof. Such alloys include Al-Ca, Al-Ge, Al-Mg, Al-Te, As-In, As-Pb, Au-Bi, Bi-In, Bi-Pb, Bi-Sn, Bi-Te, Ca-Mg, Ga-Sb, Ge-Sb, Ge-Te, In-Sb, In-Sn, In-Te, Mg-Sn, Pb-Sb, Pb-Sn, Pb-Te, Sb-Te, Sn-Te, Sn-Zn, Sn-Tl alloys and the like.

In FIG. 6, we will consider a composition A close to a composition Z, although the composition Z in which pure elements X and Y are mixed in an appropriate ratio is an eutectic mixture or crystal. A film of an alloy having the composition A usually can be formed by various methods such as vacuum-deposition and sputtering. The as-deposited film is an amorphous film in which the elements X and Y are mixed in an order of atom or is composed of an assembly of extremely fine crystallites. When a strong laser beam is irradiated onto the film at a diameter of about 1 μm, by focusing the beam on the film to heat a small region of the film, that small region becomes a fused state corresponding to the point P in FIG. 6. After stopping the light irradiation, the temperature of the small region of the film gradually drops to the liquidus $l_1$. At that time (point Q), deposition or crystallization of the element X begins. During cooling, as the heat is scattered and lost radially, a part of the small region which first reaches the point Q is the most outward peripheral part of the fused region. As time passes and cooling proceeds further, the fused region is narrowed to a central portion of the original fused region. Since the element X is gradually deposited at the peripheral portion, the concentration of the elements Y gradually increases in the average composition of the central fused portion, i.e., that average composition moves toward the point R from the point Q on the liquidus $l_1$. Finally reaching the eutectic temperature $T_1$, the fused portion reaches the point R and is then crystallized to form an assembly of crystallites of the elements X and Y having the eutectic composition Z. This assembly of crystallites is not a mixture of the elements X and Y in an order of atom, but is a mixture of crystallites of the respective elements X and Y, wherein the average composition thereof is Z.

Figure 7A:
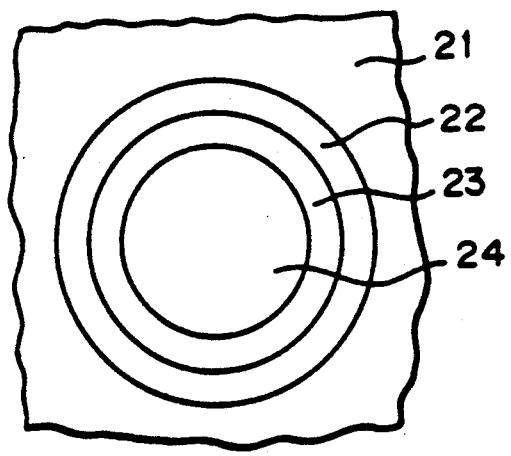
FIGS. 7A and 7B are schematical plan views of the two crystal structures at the portion irradiated with laser beams under different conditions respectively.
Figure 21:
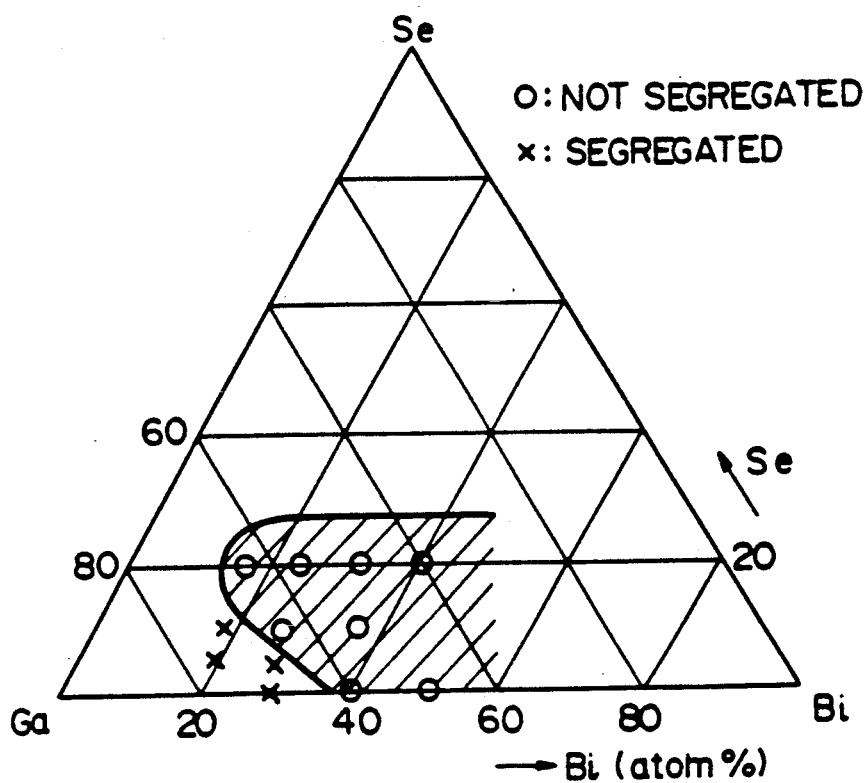
FIG. 21 is a ternary phase diagram showing whether or not segregation is caused when Se is added to the GaBi system.

However, it is supposed that as the fusion and solidification with irradiation of a laser beam are dynamic or occur in a nonequilibrium state, the results do not always coincide with the equilibrium diagram. Because the fused region of the film formed by a laser beam is within an extremely small space as small as 1 μm or less in size, resulting in supercooling, rapid cooling etc. therein, even the assembly of crystallites does not become a mixture in which the crystallites X and Y are uniformly mixed. That is, as the crystallites of the element X have crystallized at a peripheral portion of the original fused region, during solidification of a central portion, the crystallites of the element X provide seeds for crystallization and, therefore, the elements X tend to precedingly crystallize and the elements Y tend to remain in a more central portion. As a result, at a temperature of below $T_1$, a distribution of crystallites as shown in FIG. 7A results. In FIG. 7A, 21 denotes an outside portion not irradiated with light and showing an amorphous or extremely fine crystallite state of a mixture of the elements X and Y, 22 a portion of crystalline element X, 23 a portion of crystalline element X including an admixture of crystallites of the element Y, and 24 a central portion of crystalline element Y. This is one stable crystalline state of the memory film, which is used for recording information. The feature of this state is that although the average element composition is A, the composition of a most central portion is almost B which contains an extremely large amount of the element Y.

The second stable crystalline state of the memory film is described below. A laser beam is again irradiated to the memory film in the first stable crystalline state as described above. The laser beam usually has an intension distribution in the form of the nomal distribution and, therefore, is strongest in its intensity at a central portion of the beam. Thus a portion of the film which, by irradiation of the laser beam, is heated to increase its temperatue and first reaches a fused state is a central portion of the beam-irradiated region. The fused state corresponds to the point L in the equilibrium diagram in FIG. 6 since the central portion has a higher concentration of the element Y due to the former irradiation. After stopping irradiation of the laser beam, when cooling is proceeded and reaches the liquidus $l_2$, the elements Y begin to crystallize. However, since the peripheral portion of the fused region is surrounded by the crystalline element Y, there is no seed for crystallization of the element Y and, therefore, deposition of the element Y is not so rapid as in the former case at the point Q. Nevertheless, with the gradual proceeding of cooling, the composition of the fused portion approaches the eutectic point R and the composition of the central portion becomes the point A wherein the concentration of the element X is higher as before when the fusion is finally solidified. This state is shown in FIG. 7B, which shows a feature wherein crystallites of the elements X and Y are mixed in a considerably disturbed state.

Figure 7B:
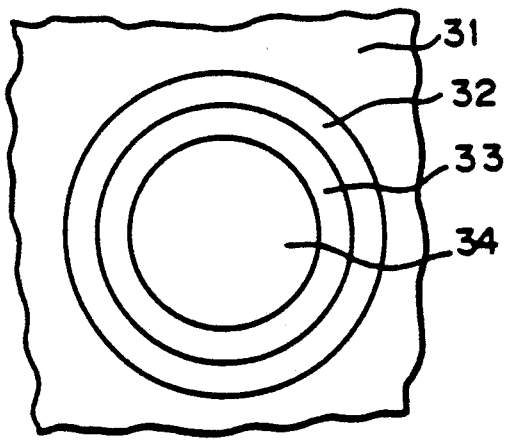
Figure 31:
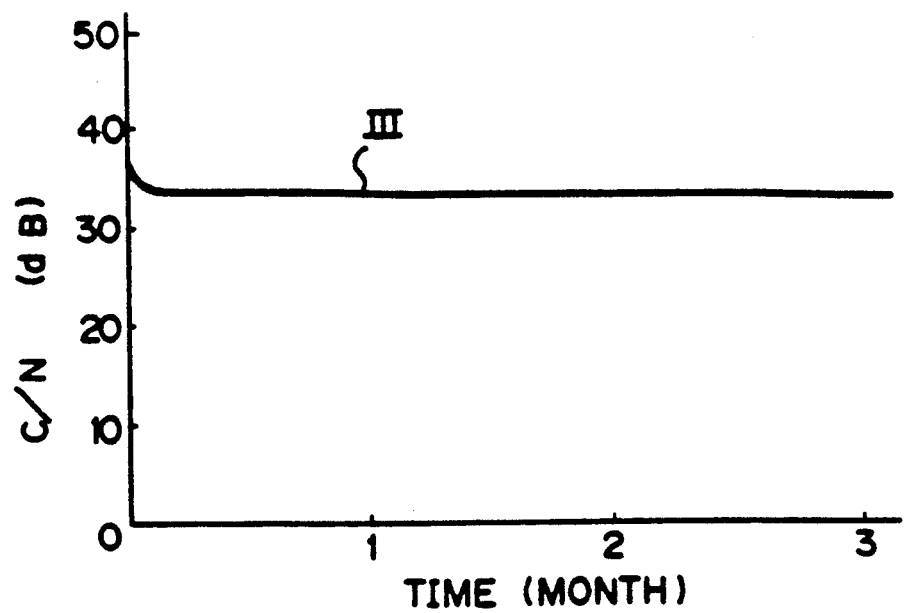

In FIG. 7B, 31 denotes an outside portion not irradiated with light and being in an amorphous or extremely fine crystallite state in which the elements X and Y are mixed, 32 a portion of crystalline element X, 33 a crystalline element Y comprising an admixture of crystallites of the element X, and 34 a portion of a mixture of crystallites of the elements X and Y where the element X is present in a larger amount than the element Y.

The two states shown in FIGS. 7A dn 7B can be reversibly transformed. For example, the state in FIG. 7B can be transformed to the state in FIG. 7A by irradiating with a laser beam with a strong power for a short time, and in turn, the state in FIG. 7A can be transformed to the state in FIG. 7B by irradiating with a laser beam with a weak power for a relatively long time.

Usually, the crystalline states of the two kinds of elements, X and Y, have different optical characteristics. Therefore, if a central portion of a small region irradiated with a laser beam under different conditions has a different amount of either one of the two elements X and Y, that irradiated small crystalline portion has different optical characteristics such as reflectance and transmittance. Thus, by irradiating the certain portion of the film with a weak laser beam and detecting the intensity of the reflected or transmitted light, which state of the two states is present in the certain portion of the film can be recognized. As the two states can be reversibly transformed, by using one state as a recorded state and the other state as an erased state, the film can be used as an erasable memory material in which information can be freely recorded and erased.

In the invention, because the film necessarily uses the process of fusion and solidification when one state storing information is transformed to the other erasure state, the transformation between different states is not limited to a particular time period, which is different from the case of a, so-called, crystallization of an amorphous state and allows a high speed recording and erasing.

EXAMPLE 1

Formation of InSb Film

Figure 8:
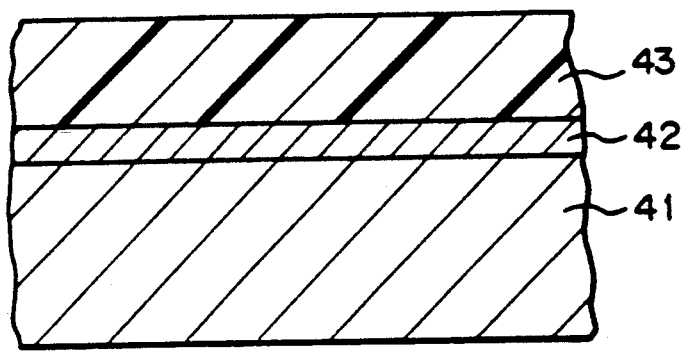
FIGS. 8 and 9 are sectional views showing the main part of the optical information memory medium for use in carrying out the present invention.
Figure 9:
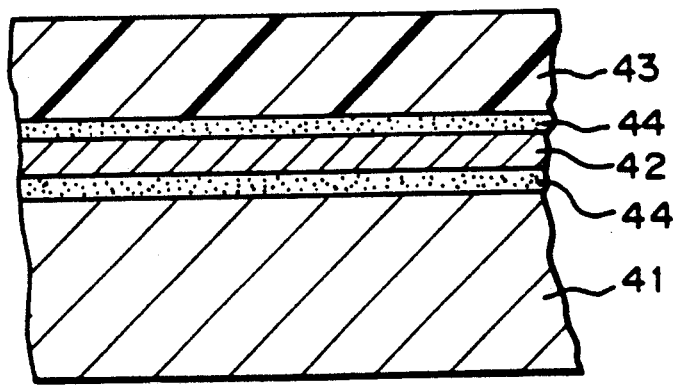

Referring to FIG. 8, a film 42 of an alloy of $In_{40}Sb_{60}$ was formed on an acrylic substrate 41 having an outer diameter of 30 cm and a thickness of 1.2 mm, by vacuum deposition. The temperatures of the evaporation sources of the respective components were independently controlled and the substrate was rotated so that the rates of evaporation of the respective components were constant. The thickness of the formed film was 90 nm. A protecting film 43 of an organic polymer having thickness of 100 nm was formed on the alloy film. Ordinary the thickness of the protecting film is 50 to 300 nm. Any material can be used for the protecting film, in so far as it does not have a bad influence on the InSb recording film. For example, thermoplastic resins such as PMMA and polystyrene (PS), and thermosetting resins such as an epoxy resin and ultraviolet ray-curable resins may be used. As shown in FIG. 9, a very thin inorganic transparent film (for example, $SiO_2$, $CeO_2$, $SnO_2$ or ZnS) having a thickness of less than few hundred angstroms may be formed as a stabilizing layer 44 between layers 41 and 42 and between layers 42 and 43.

CHANGE OF REFLECTANCE

By using an optical head in which the beam diameter of semiconductor laser light ($\lambda = 830$ nm) was reduced to 1 μm by a collimator lens and an object lens, the semiconductor laser light was directly modulated while rotating the disk, and the disk was irradiated with the semiconductor laser light. At this point, the position of the object lens was controlled so that the laser light was most concentrated on the recording film. The maximum of the intensity of the light beam applied to the recording layer was 20 mW.

When the disk was irradiated with the laser light at a laser power of 5 mW while rotating the disk at 600 rpm, the reflectance from the recording film was gradually reduced with the rotation. When the disk had made 5 rotations, the change of reflectance was substantially stopped, and hence, the laser power was reduced below 1 mW. Then, the semiconductor laser was driven at a peak power of 20 mW by a rectangular wave of 2 MHz and the disk was irradiated with the laser light for only one rotation, whereby the reflectance of the portion exposed to the pulsative light was increased. When the reflectance on the disk was continuously measured at 1 mW, a signal of 2 MHz was detected at a C/N of 40 to 45 dB.

When the disk was continuously irradiated at a power of 5 mW, the reflectance was reduced again and the signal component of 2 MHz disappeared. Thus, it was confirmed that by irradiation with the modulated pulsatile light and continuous irradiation at a lower power, recording and erasure of signals could be repeated, and it was found that the repetition frequency exceeded $10^4$.

A part of the disk was separated, and the parted disk was irradiated with light pulses in the stationary state. Since the time required for one point of the recording flm on the disk in the rotating state to traverse the laser light (diameter $\phi = 1$ μm) was about 200 ns, irradiation with the light pulse was effected in compliance with this time. At first, when irradiation at a power of 5 mW for 200 ns was repeated 5 times, the reflectance was reduced. Then, when the irradiation point was changed and irradiation at 5 mW for 200 ns was repeated 5 times and irradiation at 20 mW for 200 ns was conducted once, the reflectance was increased. It was confirmed that, by repeating the above two operations, the reflectance was increased and reduced repeatedly.

Generally, a laser pulse having a power of 3 to 20 and a pulse width of 50 to 200 ns may be used for recording, and a laser pulse having a power of 1 to 8 mW and a pulse width of 0.1 to 10 μs may be used for erasing.

Evaluation of Crystal Structure

The recording film was peeled from the parted disk, and the crystal structure of the film was examined by an electron microscope.

In the unrecorded portion which had not been irradiated with laser light at all after formation of the film, diffraction of the electrons due to a regular arrangement of crystals was not observed and this portion was in the amorphous state. In the portion where the reflectance was reduced by repeating irradiation with light pulses many times, as is seen from the photos of FIGS. 4A and 4B, complete crystallization of spots having a diameter of about 1 μm was caused. When the portion where the reflectance was increased again by irradiation with strong pulses was observed, it was found that the crystalline state was similarly produced as is seen from the photos of FIGS. 4B dn 5B but the size of crystal grains at the central part became larger. In FIGS. 4 and 5, the photos of FIGS. 4A and 5A show diffraction patterns by the electron microscope and the photos of FIGS. 4B and 5B show bright field images by the electron microscope. From this electron microscope observation, it was confirmed that information was not recorded by the phase transition between the crystalline state and the amorphous state (the disturbed crystalline state resembling the state just after formation of the film) but crystallization was once caused and information was recorded by the change of the crystalline state.

Note, in the scanning electron microscope observation, it was found that slight convexities and concavities were present in the irradiated portion of the film, and it was confirmed that the direction of convexities and concavities in the recorded portion was the reverse of the direction of convexities and concavities in the erased portion.

Electric Conductivity

Figure 10:
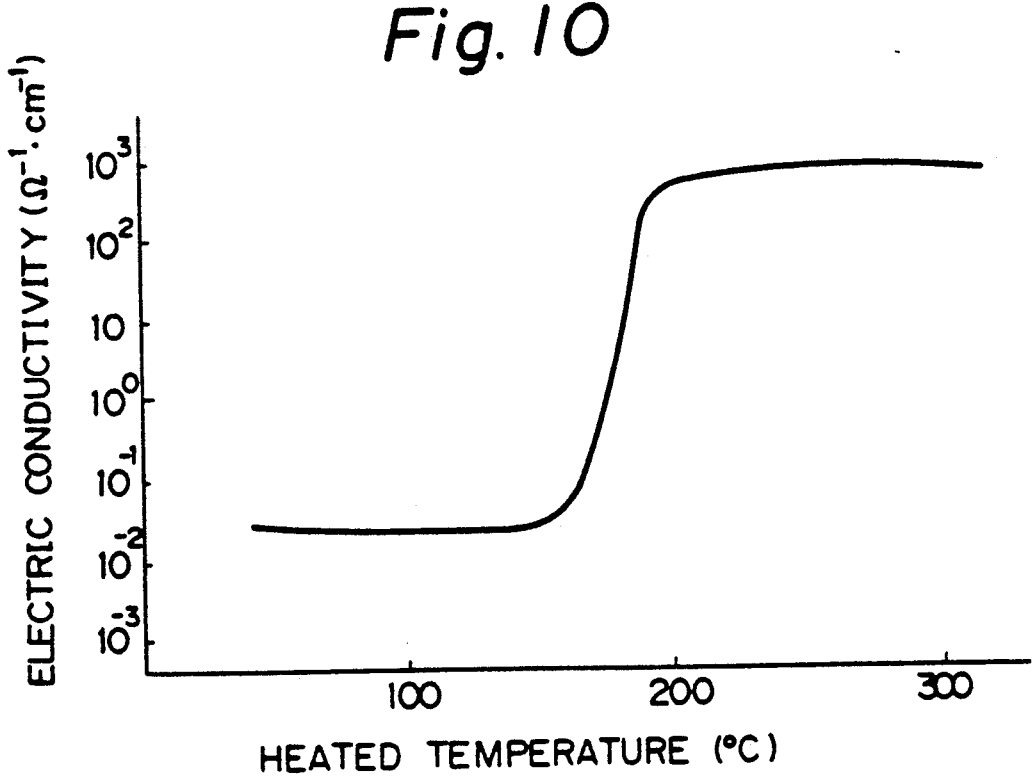
FIG. 10 is a graph showing the temperature dependency of the electrical conductivity of the InSb film.

A film was formed on a quartz substrate in the same manner as described above and the film was heated in an electric furnace, taken out from the furnace, and cooled at room temperature. Then, the electric conductivity was measured. The obtained results are shown in the graph of FIG. 10. It is seen that the electrical conductivity was abruptly increased at about 190° C. This change of the electrical conductivity is due to the transition to the crystalline state from the amorphous state. No great change of the electrical conductivity was observed above 200° C. Since it has been confirmed that both the recorded and erased states are crystalline states from the results of the electron microscope observation, it is considered that there is no substantial difference of the electrical conductivity between the two crystalline states used for recording information, contrary to the case of using amnorphous-crystalline transition which is accompanied by a substantial change of the electrical conductivity.

Durability Test

Figure 11:
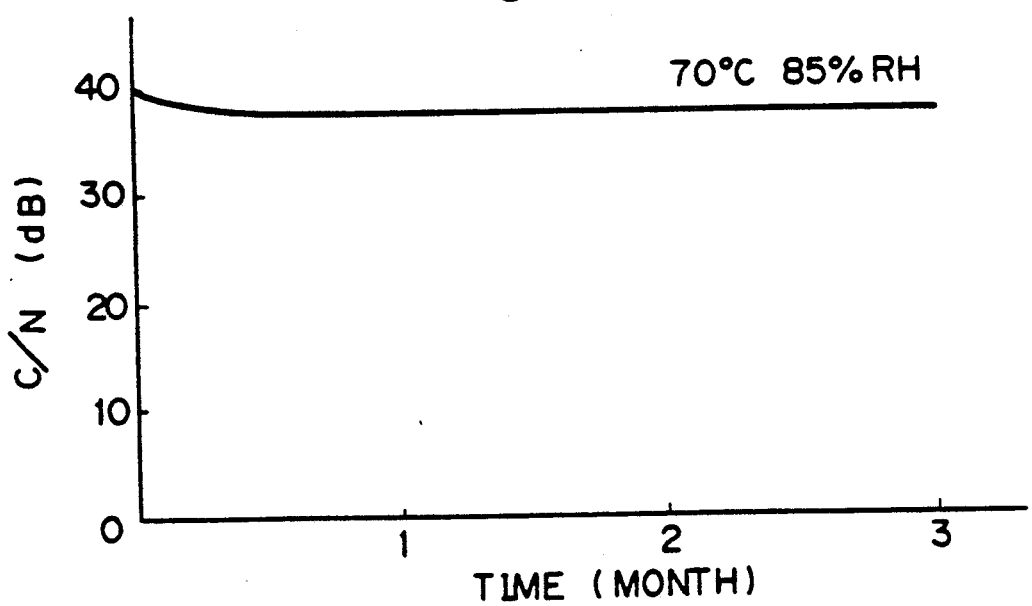
FIG. 11 is a graph showing the change of the C/N ratio of the InSb film with the lapse of a long period of time.

The above-mentioned information-recorded disk was placed in an atmosphere, maintained at a temperature of 70° C. and a relative humidity of 85%, and at certain times, the temperature was lowered to room temperature and the C/N ratio was measured. As shown in FIG. 11, even after the lapse of 3 months, the quantity of the reduction of the C/N ratio was smaller than 3 dB.

This indicates that the InSb film used for recording is chemically stable and suitable for retaining information for a long time.

EXAMPLE 2

Composition Dependency of InSb Film

Films of alloys of In and Sb were prepared on acrylic substrates in the same manner as adopted for formation of the film of $In_{40}Sb_{60}$ in Example 1, except that the composition was changed.

The so-prepared recording media were evaluated in the following manner. In the stationary state, the disk was irradiated alternately with two kinds of laser light pulses differing in power and pulse width by using an optical head in which the beam diameter of a semiconductor laser light (830 nm) was reduced to 1 μm by a collimator lens and an object lens, and the reflectance was measured with the low power laser light. In some samples a difference was found between the reflectance after irradiation with a laser light of 10 mW for 200 ns and the reflectance after irradiation with a laser light of 5 mW for 500 ns. The reflectance was reversibly changed, and the reflectance was increased by large-power short pulses and reduced by small-power short pulses. When the dependency of the reflectance on the composition of the alloy film was examined, it was found that the reflectance was reversibly changed if the Sb content was in the range of from 20 atom % or more (but not 100%). However, in the region where the In content was high, segregation of In was caused and the film was not practically suitable. It was also found that, preferably, the Sb content is in the range of from 50 to 85 atom %.

Equilibrium Diagram

Figure 12:
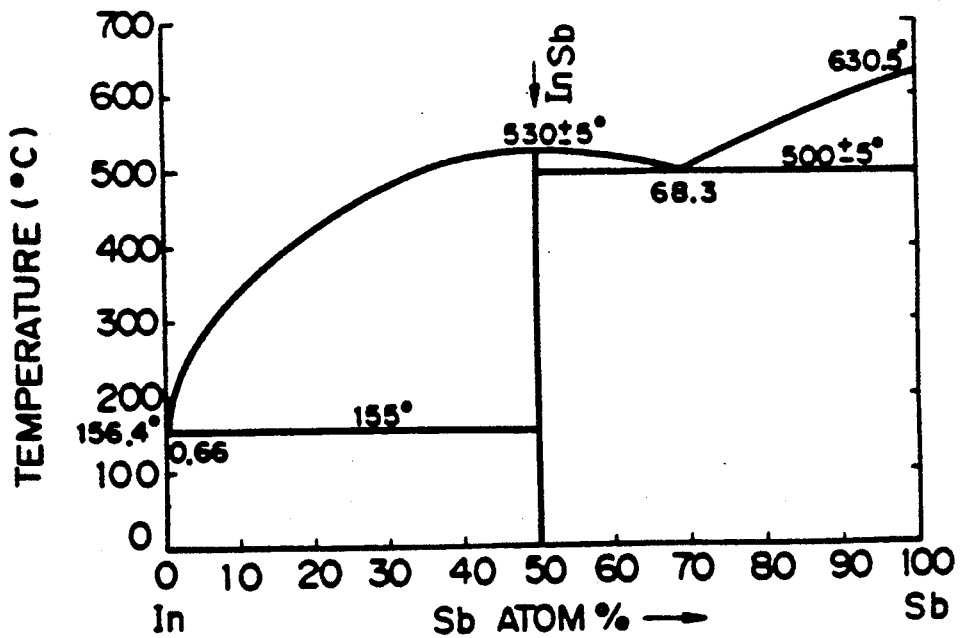
FIG. 12 is an equilibrium diagram of an InSb alloy system.

FIG. 12 shows the equilibrium diagram of In-Sb binary alloy system (from "Constitution of binary alloy", MCGRAW-HILL). In an alloy of In and Sb, an intermetallic compound InSb is formed at an atom ratio of In:Sb of 1:1 and an eutectic composition is taken at an atom ratio of In:Sb of 31.7:68.3. From the equilibrium diagram in FIG. 12, theoretically, it can be seen that an alloy composed of 50 atom % or less of In and 50 atom % or more of Sb shows an eutectic phenomenon and thus is suitable for a memory material, and particularly, an alloy composed of 15 to 50 atom %, more preferably, 35 to 45 atom %, of In and 50 to 85 atom %, more preferably, 55 to 65 atom %, of Sb is a preferable memory material since if an alloy comprises more than 68.3 atom % of Sb, a considerably high power is necessary for recording and erasing, or the sensitivity is reduced. These theoretical recognitions basically coincide with the experimental results.

EXAMPLE 3

Figure 13:
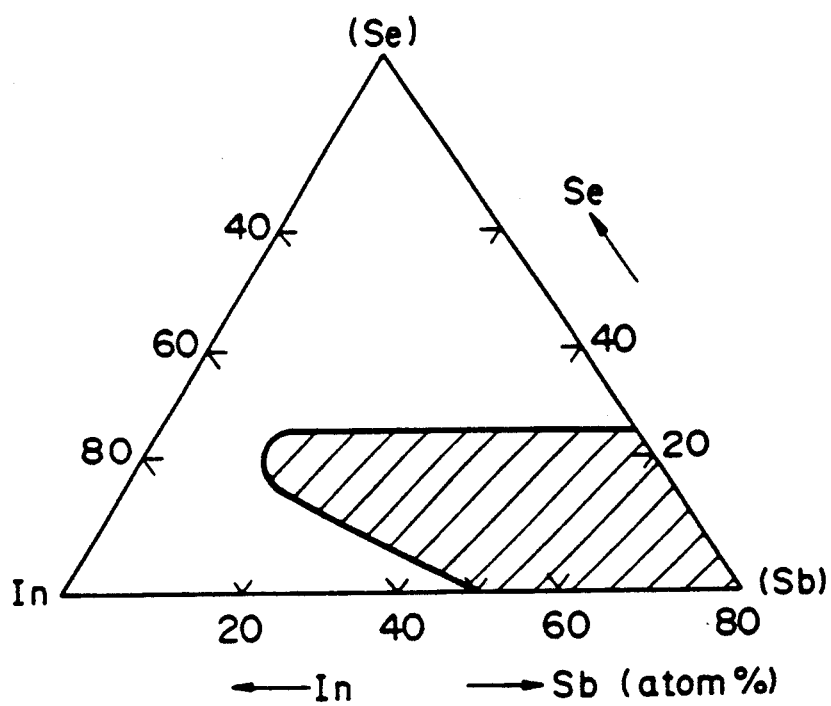
FIG. 13 is a ternary phase diagram showing whether or not segregation is caused when Se is added to the InSb system.

An additive was added to the medium of InSb and the effect was examined. Se was added in an amount of 5, 10 or 20 atom % based on the total composition, and the resulting medium was evaluated according to the method described in Example 2. By the addition of Se, the occurrence of segregation of In was prevented even if the In content was high. As shown in FIG. 13, the region where segregation of In did not occur was expanded and it was found that the addition of Se is effective for stabilization. In FIG. 13, the hatched region is the region where segregation was not caused.

Similar results were obtained when Si, P, S, Ge or As was added instead of Se.

EXAMPLE 4

Media were prepared by adding Zn in an amount of 5, 10 or 20 atom % based on the total composition while keeping the In/Sb atomic ratio constant (40/60), and they were evaluated according to the method described in Example 2. The quantity of the change of the reflectance was evaluated based on the reflectance contrast obtained by dividing the quantity of the change of the reflectance by the reflectance of the high-reflectance state. The obtained results are shown below.

| Zn Content (atom %) | Contrast (%) |
|---|---|
| 0 | 25 |
| 5 | 28 |
| 10 | 33 |
| 20 | 30 |

From the above results, it is seen that the contrast is increased by the addition of Zn.

Similar results were obtained when Al, Ag, Cd, Sn, Pb, Te or Bi was added instead of Zn.

EXAMPLE 5

Figure 14:
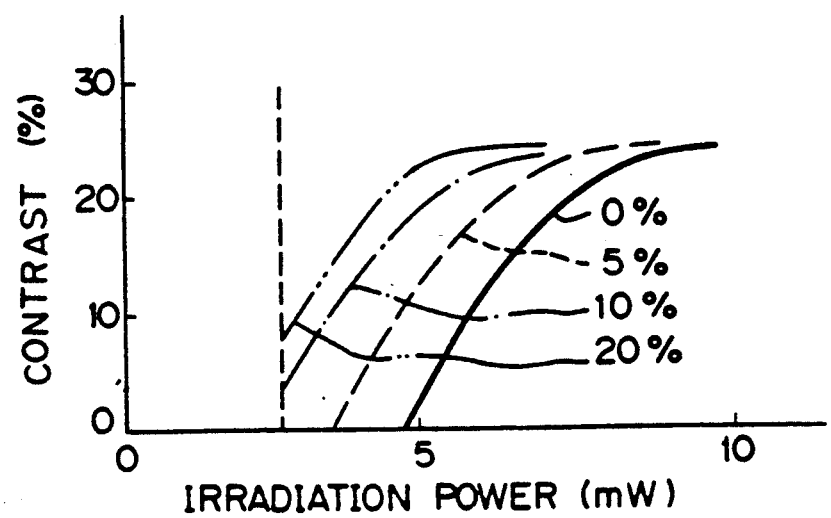
FIG. 14 is a graph showing the reflectance contrast, obtained when As is added to InSb, relative to the laser pulse power.

Media were prepared by adding As in an amount of 5, 10 or 20 atom % based on the total composition while keeping the In/Sb atomic ratio constant (40/60), and they were evaluated according to the method described in Example 2. The reflectance constants were determined by changing only the power by high-power short-pulse laser light. The obtained results are shown in FIG. 14. As is seen from the results shown in FIG. 14, the sensitivity of the recording medium was improved by the addition of As.

Similar results were obtained when Ga, Pb or Sn was added instead of As.

EXAMPLE 6

TlBi Film

Films of alloys of Tl and Bi with various compositions were prepared on acrylic substrates in the same manner as in Examples 1 and 2 except that the thickness of the TlBi film was 80 nm.

The prepared recording media were evaluated in the same manner as in Example 2. In some samples a difference was found between the reflectance after irradiation with a laser light of 10 mW for 200 ns and the reflectance after irradiation with a laser light of 5 mW for 1

μs. The reflectance was reversibly changed, and the reflectance was increased by large-power short pulses and reduced by small-power long pulses. When the dependency of the reflectance on the composition of the alloy film was examined, it was found that the reflectance was reversibly changed if the Bi content was in the range of from 30 atom % or more (but not 100%). However, in the region where the Bi content was in a range of 30 to 60 atom %, a change of characteristics with time was remarkable and the film was not practically suitable. It was found that, preferably, the Bi content is in the range of from 60 to 90 atom %.

Electron microscope analysis and scanning microscope observation of the crystal structure of the TlBi films show results similar to those of Example 1.

Figure 15:
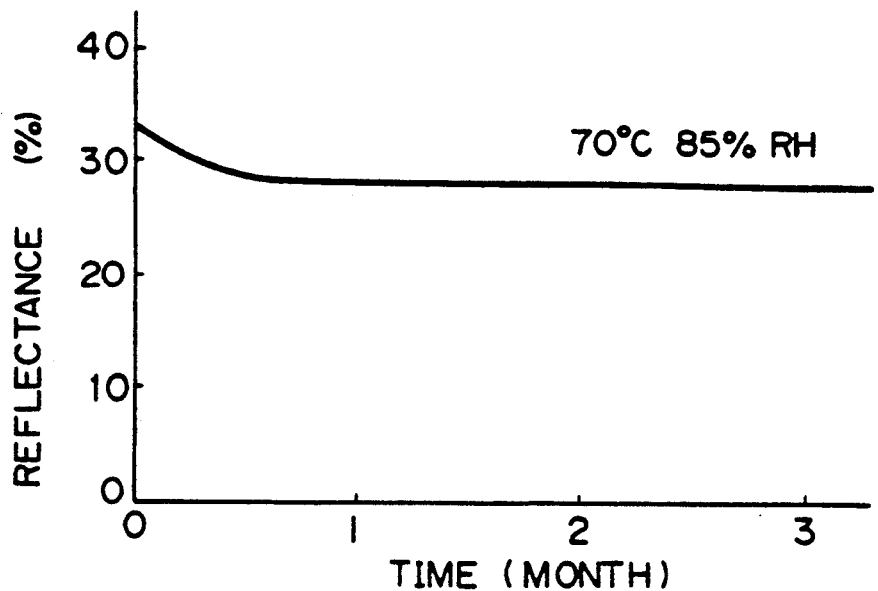
FIGS. 15 and 16 are graphs showing the changes of the reflectance and C/N of the TlBi film with the lapse of a long period of time.
Figure 16:
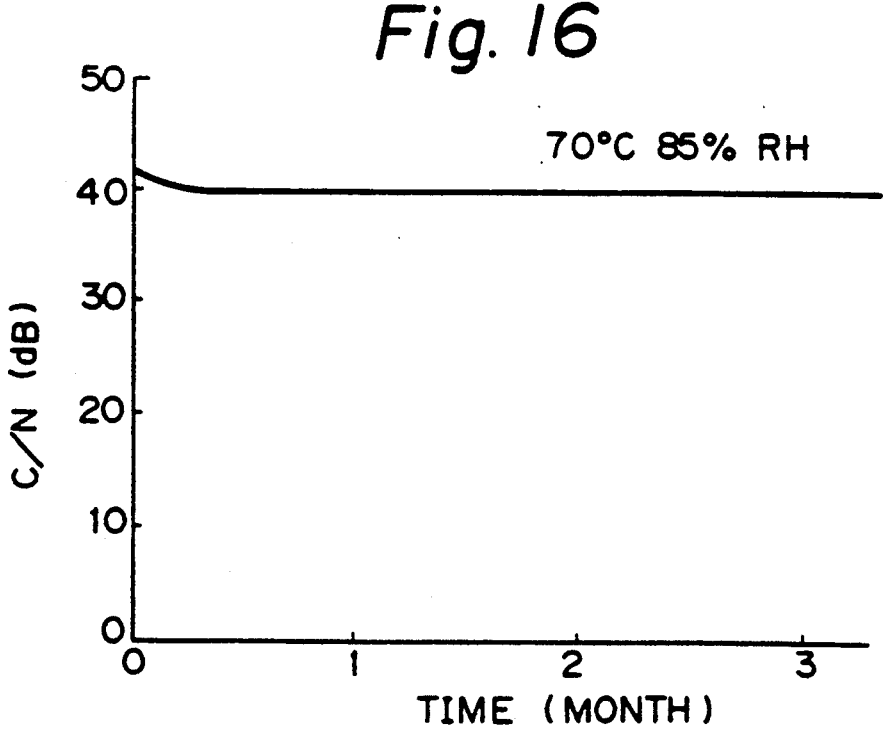

To examine the durability of the TlBi medium, the TlBi medium was deposited on slide glasses and then heated at 200° C. for 30 minutes for crystallization; the TlBi medium was not covered with a protective layer. A disc as shown in FIG. 8 was prepared with the TlBi medium and recorded in the form of tracks at 600 rpm and 2 MHz. After the medium was retained at 70° C. and 85% RH, the changes of the reflectance of the medium on the slide glasses and the change of C/N of the disc were determined. The results are shown in FIGS. 15 and 16 respectively. As seen in FIGS. 15 and 16, the change of the reflectance of the medium without a protective layer was small even after 3 months and the reduction of C/N was below 3 dB.

EXAMPLE 7

An additive was added to the medium of TlBi and the effect was examined. As was added in an amount of 5, 10 or 20 atom % based on the total composition, and the resulting medium was evaluated according to the method described in Example 6.

Figure 17:
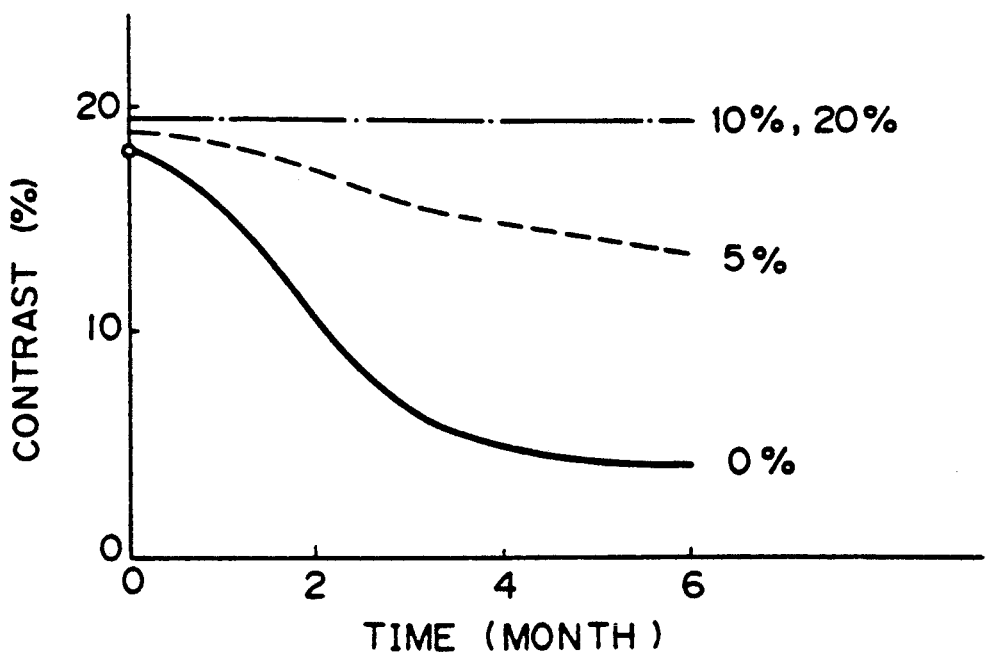
FIG. 17 is a graph showing the change of the contrast of the TlBi film added with As with the lapse of a long period of time.

It was found that, as a result of the addition of As, the change of characteristics with time was reduced even in compositions having a high amount of Tl and, as seen in FIG. 17, the change with time of contrast of even a medium containing 50 atom % of Tl was reduced, making it useful for stabilization.

Similar results were obtained when P, S, Se or Te was added instead of As.

EXAMPLE 8

Media were prepared by adding Zn in an amount of 5, 10 or 20 atom % based on the total composition while keeping the Tl/Bi atomic ratio constant (30/70), and were evaluated according to the method described in Example 6. The quantity of the change of the reflectance was evaluated based on the reflectance contrast obtained by dividing the quantity of the change of the reflectance by the reflectance of the high-reflectance state. The obtained results are shown below.

| Zn Content (atom %) | Contrast (%) |
|---|---|
| 0 | 18 |
| 5 | 20 |
| 10 | 23 |
| 20 | 20 |

From the above results, it is seen that the contrast is increased by addition of Zn.

Similar results were obtained when Al, Si, Ge, Ag, Cd, Sn, Pb, Te, Sb or In was added instead of Zn.

EXAMPLE 9

Figure 18:
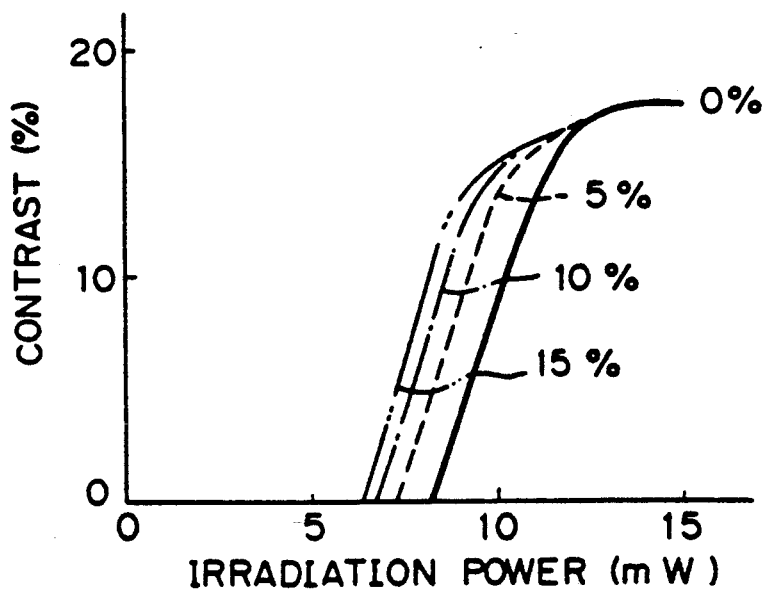
FIG. 18 is a graph showing the change of the contrast, obtained when Pb is added to the TlBi film, relative to the laser pulse power.

Media were prepared by adding Pb in an amount of 5, 10 or 15 atom %, based on the total composition while keeping the Tl/Bi atomic ratio constant (30/70), and were evaluated according to the method described in Example 6. The reflectance contrasts were determined by changing only the power by high-power short-pulse laser light. The obtained results are shown in FIG. 18. As is seen from the results shown in FIG. 18, the sensitivity of the recording medium was improved by the addition of Pb.

Similar results were obtained when In or Sn was added instead of Pb.

EXAMPLE 10

GaBi Film

Films of alloys of Ga and Bi with various compositions were prepared on acrylic substrates in the same manner as in Example 1 or 2.

The prepared recording media were evaluated in the same manner as in Example 2. In some samples a difference was found between the reflectance after irradiation with laser light of 15 mW for 200 ns and the reflectance after irradiation with laser light of 5 mW for 1 μs. The reflectance was reversibly changed, and the reflectance was increased by large-power short pulses and reduced by small-power long pulses. When the dependency of the reflectance on the composition of the alloy film was examined, it was found that the reflectance was reversibly changed if the Bi content was in the range of from 15 atom % or more (but not 100%). However, in the region where the Ga content was high, segregation of Ga was caused and the film was not practically suitable. It was found that, preferably, the Bi content is in the range of from 40 to 70 atom %.

Electron microscope analysis and scanning microscope observation of the crystal structure of the BiGa films show results similar to those of Example 1.

Figure 19:
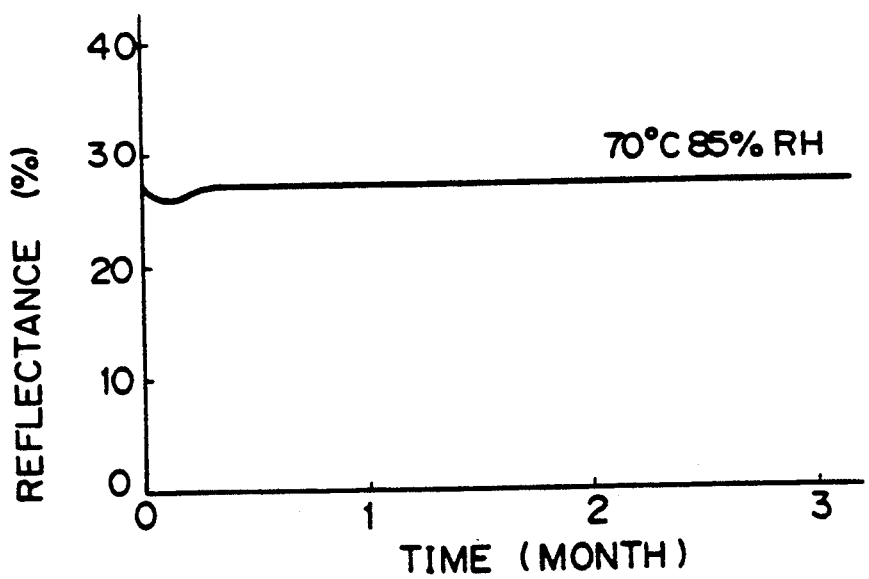
FIGS. 19 and 20 are graphs showing the changes of the reflectance and the C/N of the GaBi film with the lapse of a long period of time.
Figure 20:
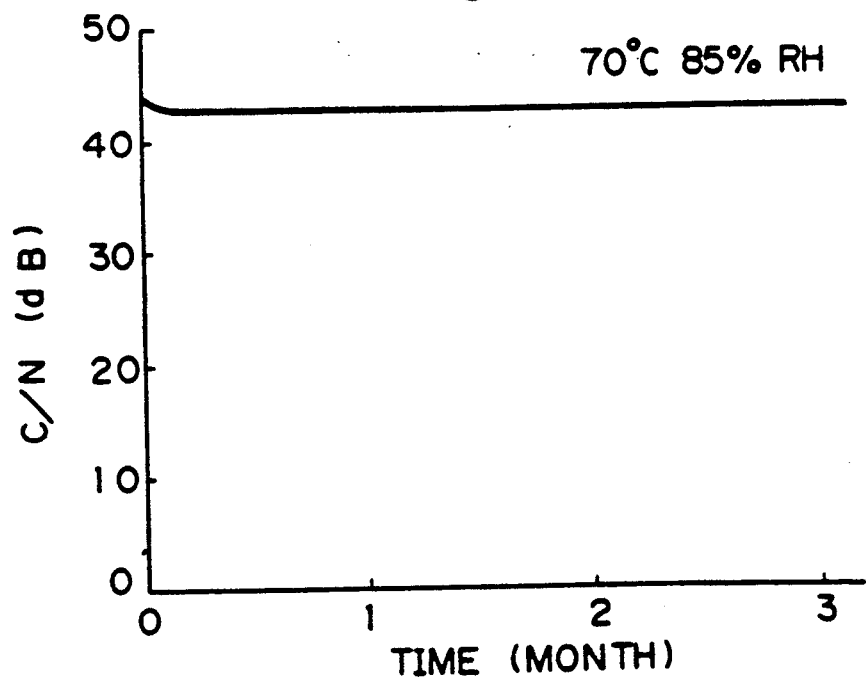

The durability test was carried out in the manner similar to that in Example 6, and similar results were obtained as shown in FIGS. 19 and 20.

EXAMPLE 11

An additive was added to the medium of GaBi and the effect was examined. Se was added in an amount of 5, 10 or 20 atom % based on the total composition, and the resulting medium was evaluated according to the method described in Example 2. By the addition of Se, the occurrence of segregation of Ga was prevented even if the Ga content was high. As shown in FIG. 21, the region where segregation of Ga did not occur was expanded and it was found that the addition of Se is effective for stabilization. In FIG. 21, marks "o" indicate non-occurrence of segregation and marks "x" indicate occurrence of segregation, and the hatched region is the region where segregation was not caused.

Similar results were obtained when Si, P, S, Ge or As was added instead of Se.

EXAMPLE 12

Media were prepared by adding Zn in an amount of 5, 10 or 20 atom % based on the total composition while keeping the Ga/Bi atomic ratio constant (60/40), and were evaluated according to the method described in Example 2. The quantity of the change of the reflectance was evaluated based on the reflectance contrast obtained by dividing the quantity of the change of the reflectance by the reflectance of the high-reflectance state. The obtained results are shown below.

| Zn Content (atom %) | Contrast (%) |
| --- | --- |
| 0 | 20 |
| 5 | 23 |
| 10 | 23 |
| 20 | 23 |

From the above results, it is seen that the contrast is increased by the addition of Zn.

Similar results were obtained when Al, Ag, Cd, Sn, Pb, Te, Sb or In was added instead of Zn.

EXAMPLE 13

Figure 22:
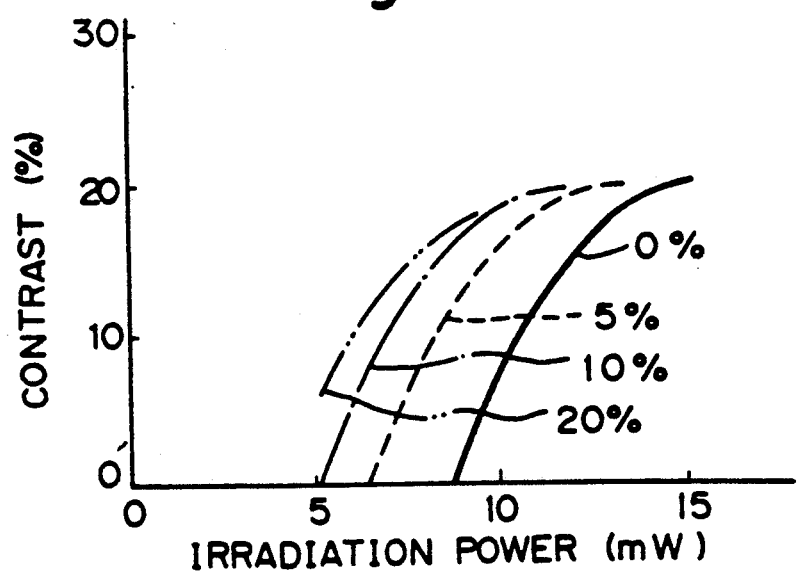
FIG. 22 is a graph showing the change of the reflectance contrast, obtained when As is added to the GaBi film.

Media were prepared by adding As in an amount of 5, 10 or 20 atom % based on the total composition while keeping the Ga/Bi atomic ratio constant (60/40), and were evaluated according to the method described in Example 2. The reflectance constants were determined by changing only the power by high-power short-pulse laser light. The obtained results are shown in FIG. 22. As is seen from the results shown in FIG. 22, the sensitivity of the recording medium was improved by the addition of As.

Similar results were obtained when In, Pb or Sn was added instead of As.

EXAMPLE 14

InAs Film

Films of alloys of In and As with various compositions were prepared on acrylic substrates in the same manner as in Example 2 except that the thickness of the InAs film was 100 nm.

The prepared recording media were evaluated in the same manner as in Example 2. In some samples a difference was found between the reflectance after irradiation with laser light of 20 mW for 200 ns and the reflectance after irradiation with laser light of 5 mW for 500 ns. The reflectance was reversibly changed, and the reflectance was increased by large-power short pulses and reduced by small-power long pulses. When the dependency of the reflectance on the composition of the alloy film was examined, it was found that the reflectance was reversibly changed if the As content was in the range of from 35 atom % or more (not 100 atom %). However, in the region where the As content was low, or the In content was high, segregation of In was caused and the film was not practically suitable. It was found that, preferably, the As content is in the range of from 50 atom % or more (but not 100 atom %).

Electron microscope analysis and scanning microscope observation of the crystal structure of the InAs films show results similar to those of Example 1.

The durability test was carried out in the manner similar to in Example 6, with the following two kinds of samples.

Sample I:

An alloy of In in an amount of 20 atom % and As in an amount of 80 atom % was deposited on an acrylic substrate having a shape of a slide glass and then heat-treated at 80° C. for 2 hours for crystallization. This sample had no protection layer.

Sample II:

While rotating sample I at 600 rpm, a focused beam of a semiconductor laser was concentrically irradiated onto the alloy film to record information of 2 MHz.

Figure 23:
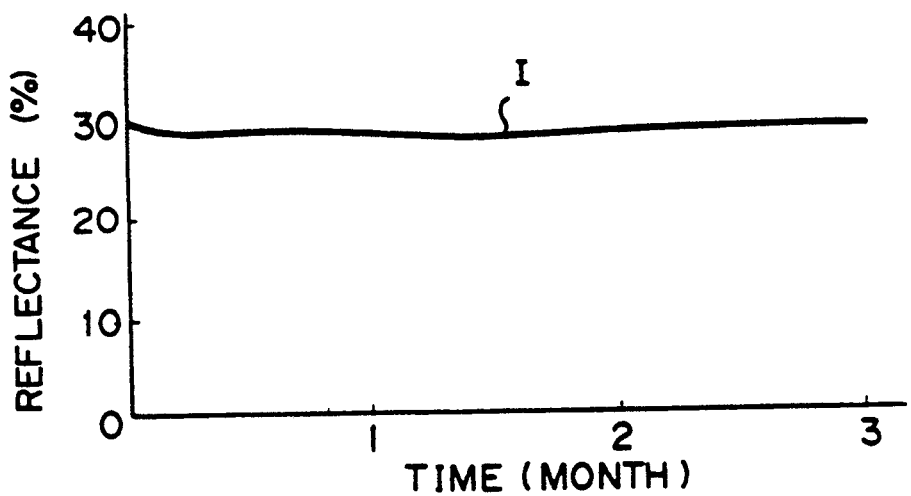
FIGS. 23 and 24 are graphs showing the change of reflectance and the C/N of the InAs film with the lapse of a long period of time.
Figure 24:
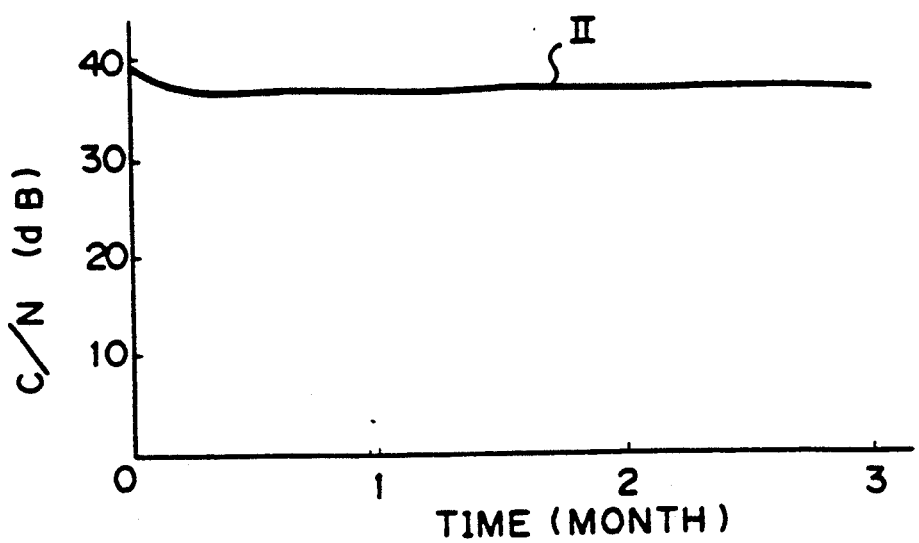

The results can be seen in FIGS. 23 and 24 and were similar to those of Example 6.

EXAMPLE 15

Figure 25:
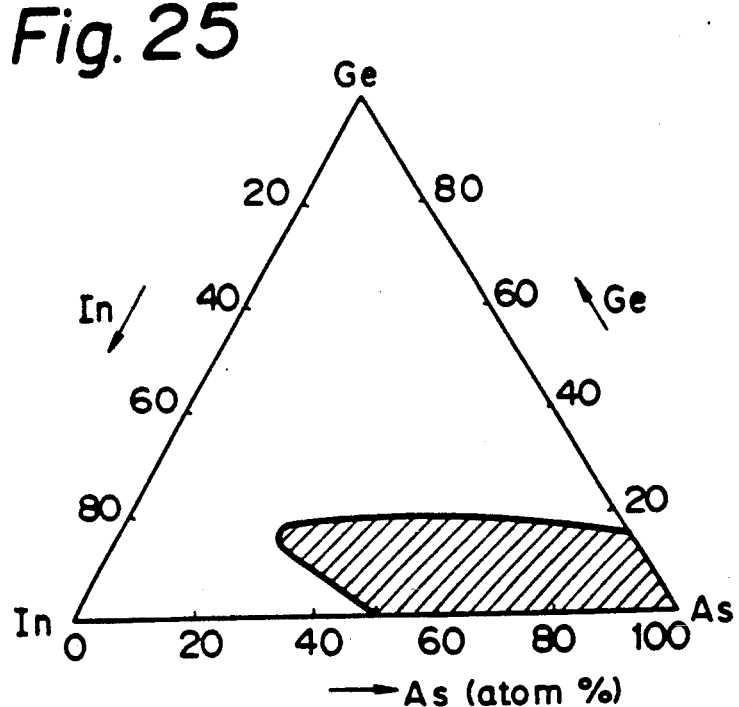
FIG. 25 is a ternary phase diagram showing whether or not segregation is caused when Ge is added to the InAs system.

An additive was added to the medium of InAs and the effect was examined. Ge was added in an amount of 5, 10 or 20 atom % based on the total composition, and the resulting medium was evaluated according to the method described in Example 2. By the addition of Ge, the occurrence of segregation of In was prevented even if the In content was high. As shown in FIG. 25, the region where segregation of In did not occur was expanded and it was found that the addition of Ge is effective for stabilization. In FIG. 25, the hatched region is the region where segregation was not caused.

Similar results were obtained when Al, Si, Zn, Se or Te was added instead of Ge.

EXAMPLE 16

Media were prepared by adding Bi in an amount of 5, 10 or 20 atom % based on the total composition while keeping the In/As atomic ratio constant (20/80), and were evaluated according to the method described in Example 2. The quantity of the change of the reflectance was evaluated based on the reflectance contrast obtained by dividing the quantity of the change of the reflectance by the reflectance of the high-reflectance state. The obtained results are shown below.

| Bi Content (atom %) | Contrast (%) |
| --- | --- |
| 0 | 15 |
| 5 | 20 |
| 10 | 17 |
| 20 | 14 |

From the above results, it is seen that the contrast is increased by the addition of Bi in an amount of 5 or 10 atom %.

Similar results were obtained when Pb, Tl, Ag, Sb or Cd was added instead of Bi.

EXAMPLE 17

Figure 26:
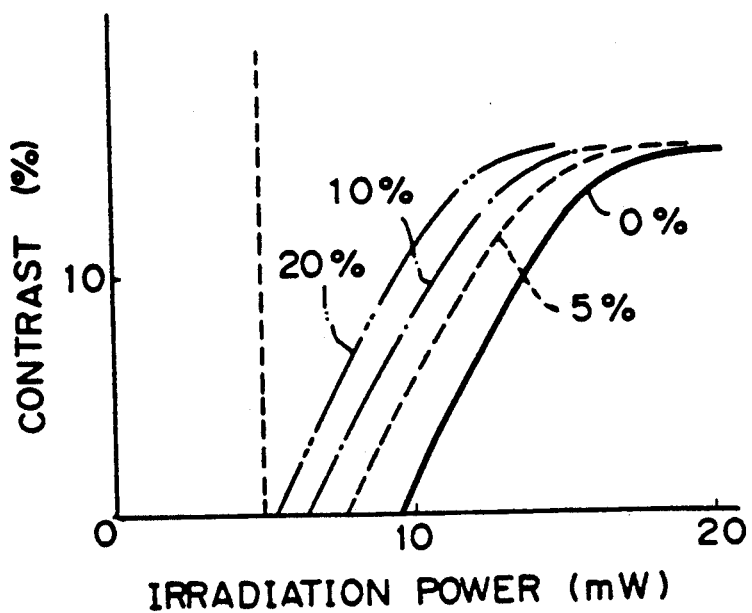
FIG. 26 is a graph showing the change of the reflectance contrast, obtained when Sn is added to the InAs film.

Media was prepared by adding Sn in an amount of 5, 10 or 20 atom % based on the total composition while keeping the In/As atomic ratio constant (20/80), and were evaluated according to the method described in Example 2. The reflectance constants were determined by changing only the power by high-power short-pulse laser light. The obtained results are shown in FIG. 26. As is seen from the results shown in FIG. 26, the sensitivity of the recording medium was improved by the addition of Sn.

Similar results were obtained when P, S, Ga, Pb or Si was added instead of Sn.

EXAMPLE 17

InBi Film

Films of alloys of In and Bi with various compositions were prepared on acrylic substrates in the same manner as in Example 2 except that the thickness of the InBi films was 120 nm.

The prepared recording media were evaluated in the same manner as in Example 2. In some samples a difference was found between the reflectance after irradiation with laser light of 20 mW for 200 ns and the reflectance after irradiation with laser light of 5 mW for 500 ns. The reflectance was reversibly changed, and the reflectance was increased by large-power short pulses and reduced by small-power long pulses. When the dependency of the reflectance on the composition of the alloy film was examined, it was found that the reflectance was reversibly changed if the Bi content was in the range of from 10 to 40 atom %. It was found that, preferably, the Bi content is in the range of from 10 to 33%.

Electron microscope analysis and scanning microscope observation of the crystal structure of the InBi films show results similar to those of Example 1.

Durability tests were carried out in accordance with the procedures in Example 6, using the following three types of samples.

Sample I (reference):

An alloy of In in an amount of 70 atom % and Bi in an amount of 30 atom % was deposited on an acrylic substrate having a shape of a slide glass. This film was not heat-treated and was not covered with any protective layer.

Sample II (The Invention):

An alloy of $In_{70}Bi_{30}$ was deposited on an acrylic substrate having a shape of a slide glass and was heat-treated at 80° C. for 2 hours for crystallization. No protective layer was formed on the alloy layer.

Sample III (The Invention):

With rotating the Sample II at 600 rpm, a focused beam of a semiconductor laser is concentrically irradiated onto the medium to record information of 2 MHz.

Figure 27:
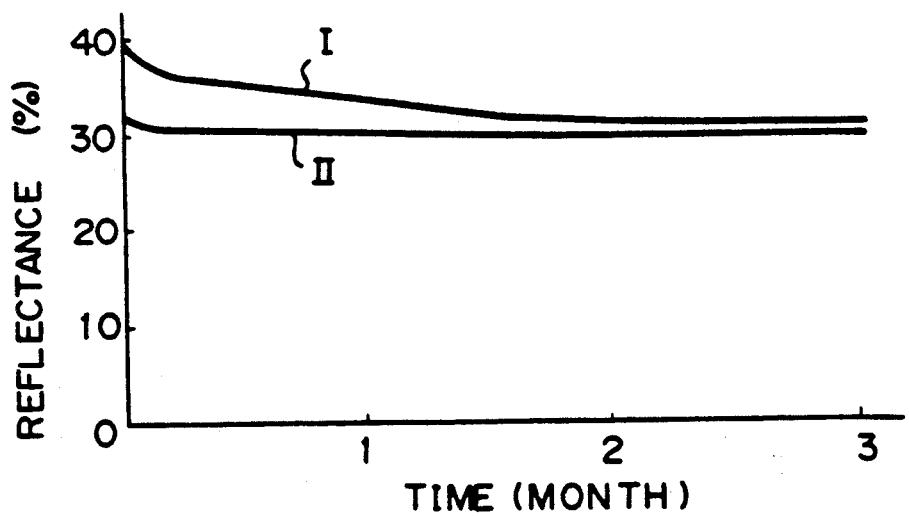
FIGS. 27 and 28 are graphs showing the changes of the reflectance and the C/N of the InBi film with the lapse of a long period of time.
Figure 28:
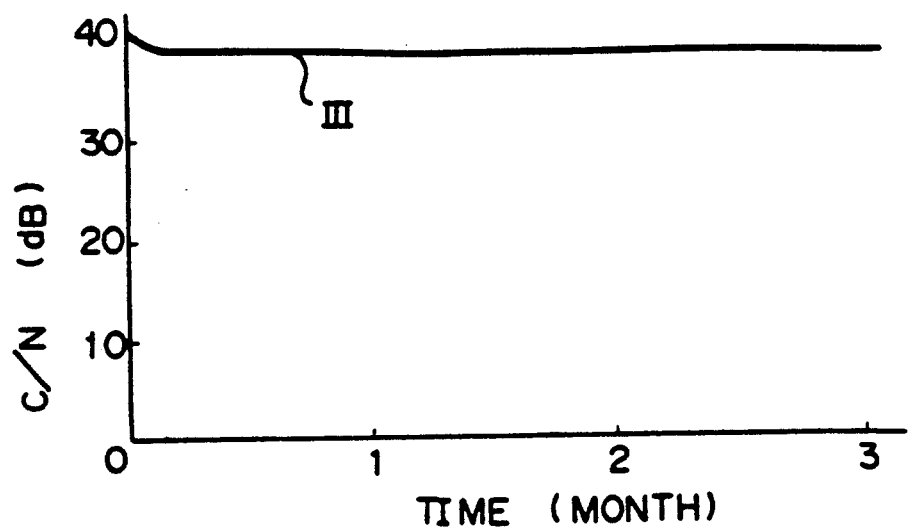

The results are shown in FIGS. 27 and 28.

The sample I demonstrated a remarkable change of the reflectance with time, shown as the line I in FIG. 27. In contrast, sample II, an example of a medium according to the invention, demonstrated a very stable reflectance, shown as the line II in FIG. 27. In fact, the reflectance of the sample hardly changed after 3 months. The change of the reflectance of sample III was similar to that of sample II.

The sample III demonstrated the change of C/N ratio, shown as the line III in FIG. 28. As seen in FIG. 28, sample III demonstrated only a change of C/N ratio of less than 3 dB after 3 months.

EXAMPLE 18

An additive was added to the medium of $In_{70}Bi_{30}$ and the effect was examined. As was added in an amount of 5, 10 or 20 atom % based on the total composition, and the resulting medium was evaluated according to the method described in Example 2. By the addition of As, the occurrence of segregation of In was prevented even if the In content was high.

Similar results were obtained when Al, Si, Zn, Ge, Ag, Sb, Se or Te was added instead of As.

EXAMPLE 19

Media were prepared by adding Sn in an amount of 5, 10 or 20 atom % based on the total composition while keeping the In/Bi atomic ratio constant (70/30), and were evaluated according to the method described in Example 2. The quantity of the change of the reflectance was evaluated based on the reflectance contrast obtained by dividing the quantity of the change of the reflectance by the reflectance of the high-reflectance state. The obtained results are shown below.

| Sn Content (atom %) | Contrast (%) |
| --- | --- |
| 0 | 16 |
| 5 | 21 |
| 10 | 18 |
| 20 | 15 |

From the above results, it is seen that the contrast is increased by the addition of Sn in an amount of 5 or 10 atom %.

Similar results were obtained when As, Cd, Tl or Pb was added instead of Sn.

EXAMPLE 20

Figure 29:
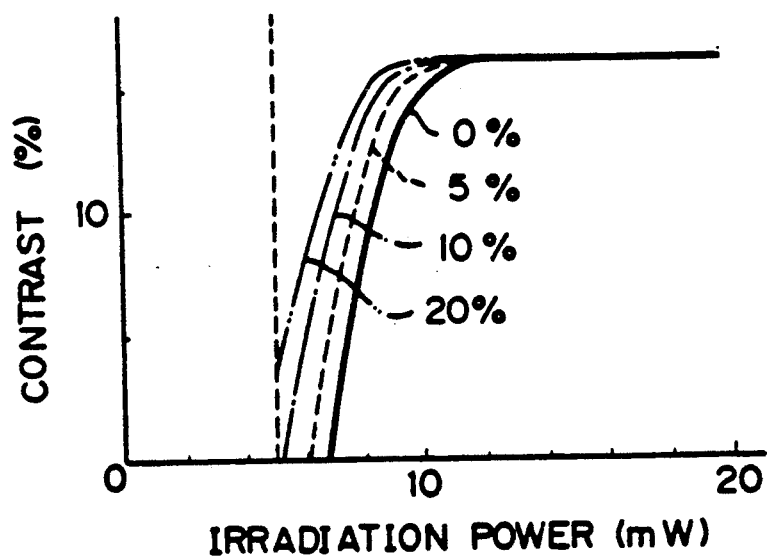
FIG. 29 is a graph showing the change of the reflectance contrast, obtained when Ga is added to the InBi film.

Media were prepared by adding Ga in an amount of 5, 10 or 20 atom % based on the total composition while keeping the In/Bi atomic ratio constant (70/30), and were evaluated according to the method described in Example 2. The reflectance constants were determined by changing only the power by high-power short-pulse laser light. The obtained results are shown in FIG. 29. As is seen from the results shown in FIG. 29, the sensitivity of the recording medium was improved by the addition of Ga.

Similar results were obtained when P, S, Se or Sn was added instead of As.

EXAMPLE 21

GaSb Film

Films of alloys of Ga and Sb with various compositions were prepared on acrylic substrates in the same manner as in Example 2 except that the thickness of the GaSb films was 180 nm.

The prepared recording media were evaluated in the same manner as in Example 2. In some samples a difference was found between the reflectance after irradiation with laser light of 10 mW for 100 ns and the reflectance after irradiation with laser light of 5 mW for 500 ns. The reflectance was reversibly changed, and the reflectance was increased by large-power short pulses and reduced by small-power long pulses. When the dependency of the reflectance on the composition of the alloy film was examined, it was found that the reflectance was reversibly changed if the Ga content was in the range of from 60 atom % or less. However, in the region where the Ga content was more than 50 atom %, striped patterns appeared on the film, which were assumed to be caused by a segregation of Ga, and the film was not practically suitable. In the region where the Ga content was less than 5 atom %, pile-up of the film occurred at the portion irradiated with a laser beam, which was assumed to be caused by bubbles, and caused the level of change of the reflectance to become unstable, and thus the film was not suitable in practical use. Thus, it was found that preferably, the Ga content is in the range of from 5 to 50 atom %.

Electron microscope analysis and scanning microscope observation of the crystal structure of the GaSb films show results similar to those in Example 1.

The durability tests were carried out in the same manner as in Example 17, using an alloy of Ga in an amount of 35 atom % and Sb in an amount of 65 atom %.

Figure 30:
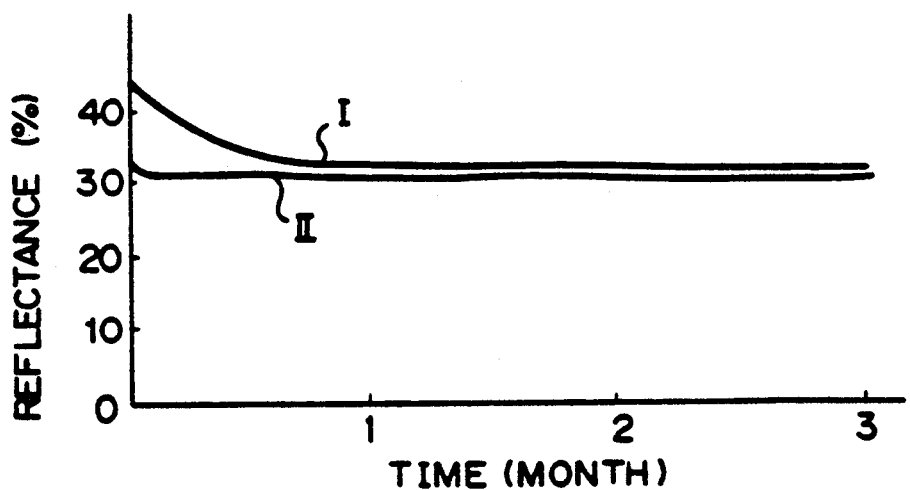
FIGS. 30 and 31 are graphs showing the changes of the reflectance and the C/N of the GaSb film.

The results are shown in FIGS. 30 and 31 and are similar to those in Example 17.

EXAMPLE 22

Figure 32:
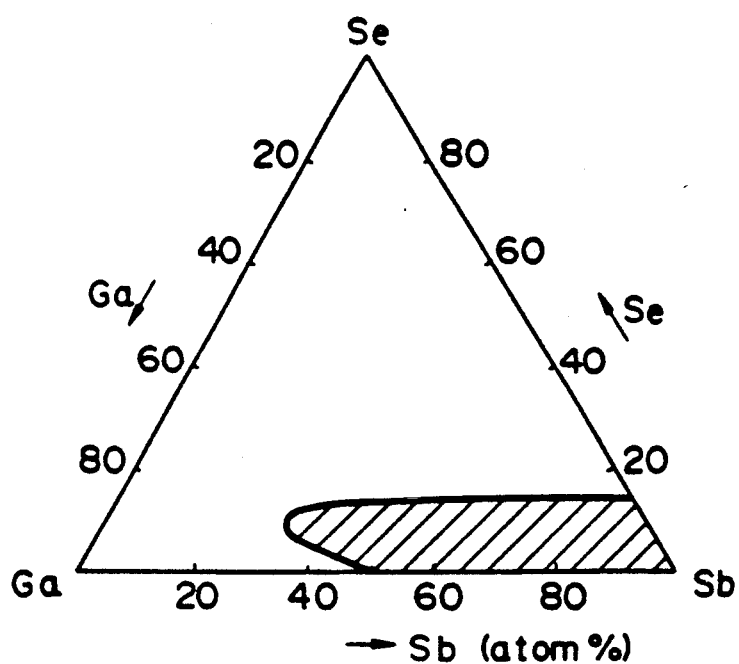
FIG. 32 is a ternary phase diagram showing whether or not segregation is caused when Se is added to the GaSb system.

An additive was added to the medium of $Ga_{35}Sb_{65}$ and the effect was examined. Se was added in an amount of 5, 10 or 15 atom % based on the total composition, and the resulting medium was evaluated according to the method described in Example 2. By addition of Se, occurrence of segregation of Ga was prevented even if the Ga content was high. As shown in FIG. 32, the region where segregation of Ga did not occur was expanded and it was found that the addition of Se is effective for stabilization. In FIG. 32, the hatched region is the region where segregation was not caused.

Similar results were obtained when Al, Si, Zn, Ge or As was added instead of Se.

EXAMPLE 23

Media were prepared by adding Sn in an amount of 5, 10 or 20 atom % based on the total composition while keeping the Ga/Sb atomic ratio constant (35/65), and they were evaluated according to the method described in Example 2. The quantity of the change of the reflectance was evaluated based on the reflectance contrast obtained by dividing the quantity of the change of the reflectance by the reflectance of the high-reflectance state. The obtained results are shown below.

| Sn Content (atom %) | Contrast (%) |
|---|---|
| 0 | 19 |
| 5 | 24 |
| 10 | 29 |
| 20 | 26 |

From the above results, it is seen that the contrast is increased by the addition of Sn.

Similar results were obtained when As, Pb, or Zn was added instead of Sn.

EXAMPLE 24

Figure 33:
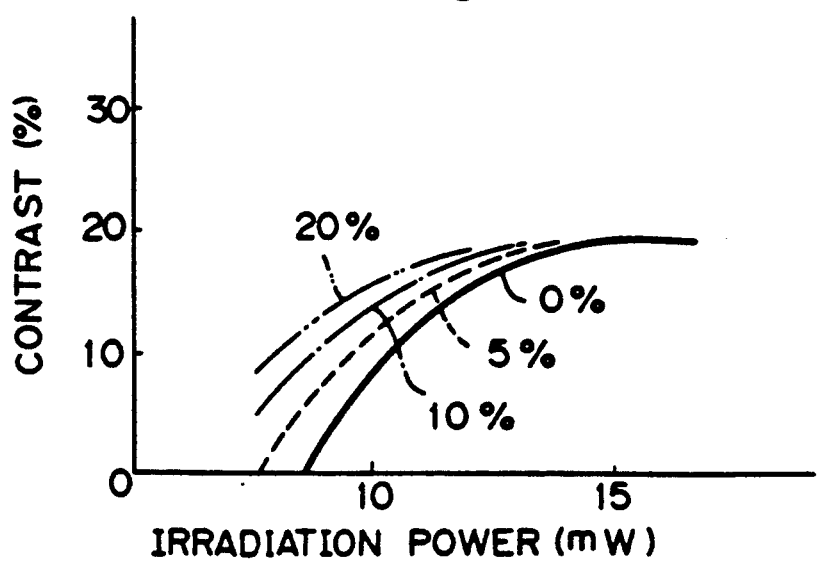
FIG. 33 is a graph showing the change of the reflectance contrast, obtained when Te is added to the GaSb film.

Media were prepared by adding Te in an amount of 5, 10 or 20 atom % based on the total composition while keeping the Ga/Sb atomic ratio constant (35/65), and were evaluated according to the method described in Example 2. The reflectance constants were determined by changing only the power by high-power short-pulse laser light. The obtained results are shown in FIG. 33. As is seen from the results shown in FIG. 33, the sensitivity of the recording medium was improved by the addition of As.

Similar results were obtained when In, P, S, Se or Sn was added instead of Te.

EXAMPLE 25

SnPb Film

A film of an alloy of Sn and Pb was prepared on an acrylic substrate in the manner as in Example 1, with the average composition of the alloy being 85 atom % of Sn and 15 atom % of Pb. The Sn-Pb alloy system has an eutectic composition where the Pb content is 26.1 atom % and the melting point is 183° C.

When the C/N ratio of the SnPb film was measured with the optical system in FIG. 1, as in Example 1, a C/N of 35 dB was obtained. In a repetition test of recording and erasing, the C/N did not change up to 100 repetitions. However, the C/N was reduced by 5 dB one day after recording and it was found that the film has a slight durability problem.

EXAMPLE 26

SnTe Film

A film of an alloy of Sn and Te was prepared on an acrylic substrate in the same manner as in Example 1, with the average composition of the alloy being 30 atom % of Sn and 70 atom % of Te. The Sn-Te alloy system has an eutectic composition where the Te content is 84 atom % and the melting point is 405° C.

C/N ratio was measured and a C/N of 45 dB was obtained. The reflectance of this film was increased when irradiated with a low-power long-pulse laser beam and decreased when irradiated with a high-power short-pulse laser beam.

We claim:

1. An optical information memory medium including a substrate, comprising:

a thin memory film, formed on the substrate including not more than 60 atom % of Gallium (Ga) and not less than 40 atom % of Antimony (Sb), capable of selectively forming two stable crystalline states, said memory film having a first crystalline state when information has been recorded and a second crystalline state when information has been erased, the first crystalline state having a first reflectivity by irradiating said memory film with an optical energy beam having a first intensity for a first time period such that the entire thickness of said memory film is fused at the irradiated portion, and the second crystalline state having a second reflectivity lower than the first reflectivity by irradiating said memory film with an optical energy beam having a second intensity less than or equal to the first intensity for a second time period longer than the first time period.

2. An optical information memory medium according to claim 1, wherein said memory film comprises 5 to 50 atom % of Ga and 50 to 95 atom % of Sb.

3. An optical information memory medium according to claim 1, wherein said memory film comprises 15 to 35 atom % of Ga and 65 to 85 atom % of Sb.

4. An optical information memory medium according to claim 1, wherein said memory film further comprises at least one element M selected from the group consisting of Al, Si, P, S, Zn, Ge, As, Se, In, Sn, Te, Bi and Pb, and wherein said memory film has a composition of $(Ga_xSb_{1-x})_{1-y}M_y$ where $x \leq 0.60$ and $y \leq 0.20$.

* * * * *

UNITED STATES PATENT AND TRADEMARK OFFICE
CERTIFICATE OF CORRECTION

Page 1 of 4

PATENT NO. : 5,072,423
DATED : DECEMBER 10, 1991
INVENTOR(S) : NAGAAKI KOSHINO ET AL

It is certified that error appears in the above-indentified patent and that said Letters Patent is hereby corrected as shown below:

TITLE PAGE [60]  Line 2, "Aug. 3," should be --Aug. 31,--.
                 Line 3, "1989, which" should be --1989,
                 Now U.S. Patent No. 5,058,061, which--.

Col. 1, line 9, "Aug. 3, 1989," should be --Aug. 31, 1989,
                    now U.S. Patent No. 5,058,061,--;
            line 33, "limitative" should be --limited--.

Col. 2,     line 23, "DISCLOSURE" should be --SUMMARY--.

Col. 3,     line 15, "mentioned" should be --employed--;
            line 28, "men-" should be --used.--;
            line 29, "tioned." should be deleted;
            line 30, "be" should be deleted; and
                     "mentioned" should be --be employed--;
            line 39, "5" should be --between 5--;
            line 40, "elements also can be mentioned"
                     should be --elements, can also be
                     used.--;
            line 41, "be also mentioned" should be --also
                     be used--;
            line 43, "Ga and" should be --Ga, and--;
            line 45, "And an" should be --An--;
            line 51, "mentioned." should be --used.--;
            line 52, "There can be further mentioned"
                     should be --There can also be used--;
            line 62, "mentioned." should be --used.--;
            line 63, "There can be further mentioned"
                     should be --Further,--;
            line 67, "Bi. And an" should be --Bi can be
                     used. An--.

UNITED STATES PATENT AND TRADEMARK OFFICE
CERTIFICATE OF CORRECTION

PATENT NO. : 5,072,423                                Page 2 of 4
DATED : DECEMBER 10, 1991
INVENTOR(S) : NAGAAKI KOSHINO ET AL It is certified that error appears in the above-indentified patent and that said Letters Patent is hereby corrected as shown below:

Col. 4, line 4, "be mentioned." should be --also be used.--;
line 5, "be still further mentioned" should be --also be used--;
line 14, "men-" should be --employed.--;
line 15, "tioned." should be deleted;
line 16, "We" should be --It was--.

Col. 5, line 44, "schematical" should be --schematic--.

Col. 6, line 42, "the" should be --a--.

Col. 7, line 23, "erasion." should be --erasing.--.

line 67, "the after-mentioned" should be deleted;
line 67, "1," should be --1 (explained below),--.

Col. 8, line 27, "(1)" should be --(1) the--;
line 38, "makes a" should be deleted;
line 39, "contribution" should be --contributes--.

Col. 9, line 31, "$1_1$." should be --$\ell_1$.--;
line 43, "$1_1$" should be --$\ell_1$--.

Col. 10, line 27, "$1_2$," should be --$\ell_1$,--;
line 49, "dn" should be --and--;
line 52, "with a strong" should be --having high--;
line 55, "with" should be --having--.

UNITED STATES PATENT AND TRADEMARK OFFICE
CERTIFICATE OF CORRECTION

PATENT NO. : 5,072,423  
DATED : DECEMBER 10, 1991  
INVENTOR(S) : NAGAAKI KOSHINO ET AL

Page 3 of 4

It is certified that error appears in the above-indentified patent and that said Letters Patent is hereby corrected as shown below:

Col. 11, line 9, "a, so-called," should be --a so-called--;  
line 25, "thickness" should be --a thickness--;  
line 26, "nary" should be --narily--;  
line 34, "than few" should be --than a few--;  
line 47, "of the" should be deleted;  
line 67-68, "pulsatile" should be --pulsed--.

Col. 12, line 4, "pulses in the" should be --pulses while in a--;  
line 17, "3 to 20" should be --3 to 20 mW--;  
line 38, "dn" should be --and--.

Col. 13, line 7, "amnorphous" should be --amorphous--.

Col. 15, line 41, "with" should be --of--; and "of" should be --with respect to--.

UNITED STATES PATENT AND TRADEMARK OFFICE
CERTIFICATE OF CORRECTION

PATENT NO.   : 5,072,423

DATED        : DECEMBER 10, 1991

INVENTOR(S)  : NAGAAKI KOSHINO ET AL

It is certified that error appears in the above-indentified patent and that said Letters Patent is hereby corrected as shown below:

Col. 17, line 60, "in" should be deleted.

Col. 20, line 56, "unstable, and thus" should be --unstable. Thus--;
         line 57, "Thus, it" should be --It--.

Signed and Sealed this

Eleventh Day of January, 1994

Attest:

BRUCE LEHMAN

Attesting Officer  Commissioner of Patents and Trademarks